(12) United States Patent
Hofmann et al.

(10) Patent No.: US 11,198,181 B2
(45) Date of Patent: Dec. 14, 2021

(54) METHODS FOR FABRICATING STRAIN WAVE GEAR FLEXSPLINES USING METAL ADDITIVE MANUFACTURING

(71) Applicant: California Institute of Technology, Pasadena, CA (US)

(72) Inventors: Douglas C. Hofmann, Pasadena, CA (US); Andre M. Pate, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 355 days.

(21) Appl. No.: 15/918,831

(22) Filed: Mar. 12, 2018

(65) Prior Publication Data

US 2018/0257141 A1   Sep. 13, 2018

Related U.S. Application Data

(60) Provisional application No. 62/469,997, filed on Mar. 10, 2017.

(51) Int. Cl.
*B22F 10/20* (2021.01)
*F16H 55/06* (2006.01)
(Continued)

(52) U.S. Cl.
CPC .............. *B22F 10/20* (2021.01); *B22F 5/08* (2013.01); *B23F 5/163* (2013.01); *B23K 9/04* (2013.01); *B23K 15/0086* (2013.01); *B23K 26/34* (2013.01); *B23K 26/354* (2015.10); *B33Y 10/00* (2014.12); *B33Y 80/00* (2014.12); *F16H 49/001* (2013.01); *F16H 55/06* (2013.01);
(Continued)

(58) Field of Classification Search
CPC . B22F 3/1055; B33Y 10/00; F16H 2049/003; F16H 49/001
See application file for complete search history.

(56) References Cited

U.S. PATENT DOCUMENTS 3,435,512 A   4/1969 Macrobbie
3,519,444 A   7/1970 Brown et al.
(Continued)

FOREIGN PATENT DOCUMENTS

CN   101709773 A   5/2010
CN   102563006 A   7/2012
(Continued)

OTHER PUBLICATIONS

Berger, Uwe. "A Survey of Additive Manufacturing Processes Applied on the Fabrication of Gears"; 1st International Conference on Progress in Additive Manufacturing (Pro-AM 2014), May 26-28, 2014 (Year: 2014).*

(Continued)

*Primary Examiner* — Anthony J Zimmer
*Assistant Examiner* — Sean P. O'Keefe
(74) *Attorney, Agent, or Firm* — KPPB LLP

(57) ABSTRACT

Methods for the fabrication of metal strain wave gear flexsplines using a specialized metal additive manufacturing technique are provided. The method allows the entire flexspline to be metal printed, including all the components: the output surface with mating features, the thin wall of the cup, and the teeth integral to the flexspline. The flexspline may be used directly upon removal from the building tray.

25 Claims, 15 Drawing Sheets

(51) Int. Cl.

| | |
|---|---|
| *B33Y 10/00* | (2015.01) |
| *B33Y 80/00* | (2015.01) |
| *F16H 49/00* | (2006.01) |
| *B22F 5/08* | (2006.01) |
| *B33Y 70/00* | (2020.01) |
| *B22F 3/24* | (2006.01) |
| *B22F 10/28* | (2021.01) |
| *B23F 5/16* | (2006.01) |
| *B23K 26/34* | (2014.01) |
| *B23K 26/354* | (2014.01) |
| *B23K 9/04* | (2006.01) |
| *B23K 15/00* | (2006.01) |
| *B23K 101/00* | (2006.01) |
| *B22F 9/00* | (2006.01) |

(52) U.S. Cl.
CPC ............ *B22F 9/002* (2013.01); *B22F 10/28* (2021.01); *B22F 2003/244* (2013.01); *B22F 2003/247* (2013.01); *B22F 2998/10* (2013.01); *B22F 2999/00* (2013.01); *B23K 2101/008* (2018.08); *B33Y 70/00* (2014.12); *F16H 2049/003* (2013.01)

(56) References Cited

U.S. PATENT DOCUMENTS

| | | | |
|---|---|---|---|
| 3,529,457 | A | 9/1970 | Bowers |
| 3,682,606 | A | 8/1972 | Anderson et al. |
| 3,986,412 | A | 10/1976 | Farley et al. |
| 4,123,737 | A | 10/1978 | Hoagland, Jr. |
| RE29,989 | E | 5/1979 | Polk |
| 4,173,393 | A | 11/1979 | Maurer |
| 4,202,404 | A | 5/1980 | Carlson |
| 4,670,636 | A | 6/1987 | Taub et al. |
| 4,711,795 | A | 12/1987 | Takeuchi et al. |
| 4,749,625 | A | 6/1988 | Obayashi et al. |
| 4,783,983 | A | 11/1988 | Narasimhan |
| 4,810,314 | A | 3/1989 | Henderson et al. |
| 4,812,150 | A | 3/1989 | Scott |
| 4,823,638 | A | 4/1989 | Ishikawa |
| 4,851,296 | A | 7/1989 | Tenhover et al. |
| 4,883,632 | A | 11/1989 | Goto et al. |
| 4,935,291 | A | 6/1990 | Gunnink |
| 5,168,918 | A | 12/1992 | Okuda et al. |
| 5,185,198 | A | 2/1993 | Lefeber et al. |
| 5,288,344 | A | 2/1994 | Peker et al. |
| 5,310,432 | A | 5/1994 | Yamanaka et al. |
| 5,485,761 | A | 1/1996 | Rouverol |
| 5,509,978 | A | 4/1996 | Masumoto et al. |
| 5,636,550 | A | 6/1997 | Deane |
| 5,722,295 | A | 3/1998 | Sakai et al. |
| 5,746,844 | A | 5/1998 | Sterett et al. |
| 5,772,803 | A | 6/1998 | Peker et al. |
| 5,866,272 | A | 2/1999 | Westre et al. |
| 5,896,642 | A | 4/1999 | Peker et al. |
| 5,985,204 | A | 11/1999 | Otsuka et al. |
| 6,162,130 | A | 12/2000 | Masumoto et al. |
| 6,273,322 | B1 | 8/2001 | Yamamoto et al. |
| 6,620,264 | B2 | 9/2003 | Kundig et al. |
| 6,652,679 | B1 | 11/2003 | Inoue et al. |
| 6,771,490 | B2 | 8/2004 | Peker et al. |
| 6,843,496 | B2 | 1/2005 | Peker et al. |
| 6,887,586 | B2 | 5/2005 | Peker et al. |
| 7,052,561 | B2 | 5/2006 | Lu et al. |
| 7,073,560 | B2 | 7/2006 | Kang et al. |
| 7,075,209 | B2 | 7/2006 | Howell et al. |
| 7,323,071 | B1 | 1/2008 | Branagan |
| 7,357,731 | B2 | 4/2008 | Johnson et al. |
| 7,360,419 | B2 | 4/2008 | French et al. |
| 7,497,981 | B2 | 3/2009 | Graham et al. |
| 7,500,987 | B2 | 3/2009 | Bassler et al. |
| 7,540,929 | B2 | 6/2009 | Demetriou et al. |
| 7,552,664 | B2 | 6/2009 | Bulatowicz |
| 7,575,040 | B2 | 8/2009 | Johnson |
| 7,862,323 | B2 | 1/2011 | Micarelli et al. |
| 7,883,592 | B2 | 2/2011 | Hofmann et al. |
| 7,896,982 | B2 | 3/2011 | Johnson et al. |
| 7,955,713 | B2 | 6/2011 | Roebroeks et al. |
| 8,042,770 | B2 | 10/2011 | Martin et al. |
| 8,400,721 | B2 | 3/2013 | Bertele et al. |
| 8,418,366 | B2 | 4/2013 | Wang et al. |
| 8,485,245 | B1 | 7/2013 | Prest et al. |
| 8,496,077 | B2 | 7/2013 | Nesnas et al. |
| 8,596,106 | B2 | 12/2013 | Tang et al. |
| 8,613,815 | B2 | 12/2013 | Johnson et al. |
| 8,639,484 | B2 | 1/2014 | Wei et al. |
| 8,789,629 | B2 | 7/2014 | Parness et al. |
| 8,986,469 | B2 | 3/2015 | Khalifa et al. |
| 9,044,805 | B2 | 6/2015 | Prest et al. |
| 9,057,120 | B2 | 6/2015 | Pham et al. |
| 9,211,564 | B2 | 12/2015 | Hofmann |
| 9,328,813 | B2 | 5/2016 | Hofmann et al. |
| 9,579,718 | B2 | 2/2017 | Hofmann |
| 9,610,650 | B2 | 4/2017 | Hofmann et al. |
| 9,783,877 | B2 | 10/2017 | Hofmann et al. |
| 9,791,032 | B2 | 10/2017 | Hofmann et al. |
| 9,868,150 | B2 | 1/2018 | Hofmann et al. |
| 9,996,053 | B2 | 6/2018 | O'keeffe et al. |
| 10,081,136 | B2 | 9/2018 | Hofmann et al. |
| 10,151,377 | B2 | 12/2018 | Hofmann et al. |
| 10,155,412 | B2 | 12/2018 | Parness et al. |
| 10,174,780 | B2 | 1/2019 | Hofmann et al. |
| 10,471,652 | B2 | 11/2019 | Hofmann et al. |
| 10,487,934 | B2 | 11/2019 | Kennett et al. |
| 10,690,227 | B2 | 6/2020 | Hofmann et al. |
| 2002/0053375 | A1 | 5/2002 | Hays et al. |
| 2002/0100573 | A1 | 8/2002 | Inoue et al. |
| 2002/0184766 | A1 | 12/2002 | Kobayashi et al. |
| 2003/0052105 | A1 | 3/2003 | Nagano et al. |
| 2003/0062811 | A1 | 4/2003 | Peker et al. |
| 2004/0035502 | A1 | 2/2004 | Kang et al. |
| 2004/0103536 | A1 | 6/2004 | Kobayashi et al. |
| 2004/0103537 | A1 | 6/2004 | Kobayashi et al. |
| 2004/0154701 | A1 | 8/2004 | Lu et al. |
| 2005/0034792 | A1 | 2/2005 | Lu et al. |
| 2005/0084407 | A1 | 4/2005 | Myrick |
| 2005/0127139 | A1 | 6/2005 | Slattery et al. |
| 2005/0263932 | A1 | 12/2005 | Heugel |
| 2006/0105011 | A1 | 5/2006 | Sun et al. |
| 2006/0130944 | A1 | 6/2006 | Poon et al. |
| 2006/0156785 | A1 | 7/2006 | Mankame et al. |
| 2007/0034304 | A1 | 2/2007 | Inoue et al. |
| 2007/0144621 | A1 | 6/2007 | Farmer et al. |
| 2007/0226979 | A1 | 10/2007 | Paton et al. |
| 2007/0228592 | A1 | 10/2007 | Dunn et al. |
| 2007/0253856 | A1 | 11/2007 | Vecchio et al. |
| 2008/0085368 | A1 | 4/2008 | Gauthier et al. |
| 2008/0099175 | A1 | 5/2008 | Chu et al. |
| 2008/0121316 | A1 | 5/2008 | Duan et al. |
| 2008/0190521 | A1 | 8/2008 | Loffler et al. |
| 2008/0304975 | A1* | 12/2008 | Clark .................. B22F 3/1055 416/241 R |
| 2009/0011846 | A1 | 1/2009 | Scott |
| 2009/0078370 | A1 | 3/2009 | Sklyarevich et al. |
| 2009/0114317 | A1 | 5/2009 | Collier et al. |
| 2009/0194205 | A1 | 8/2009 | Loffler et al. |
| 2009/0246398 | A1 | 10/2009 | Kurahashi et al. |
| 2009/0263582 | A1 | 10/2009 | Batchelder |
| 2009/0277540 | A1 | 11/2009 | Langlet |
| 2009/0288741 | A1 | 11/2009 | Zhang et al. |
| 2010/0313704 | A1 | 12/2010 | Wang et al. |
| 2011/0048587 | A1 | 3/2011 | Vecchio et al. |
| 2011/0154928 | A1 | 6/2011 | Ishikawa |
| 2011/0302783 | A1 | 12/2011 | Nagata et al. |
| 2012/0006085 | A1 | 1/2012 | Johnson et al. |
| 2012/0067100 | A1 | 3/2012 | Stefansson et al. |
| 2012/0073710 | A1 | 3/2012 | Kim et al. |
| 2012/0077052 | A1 | 3/2012 | Demetriou et al. |
| 2012/0132631 | A1* | 5/2012 | Wescott ............... B22F 3/1055 219/121.85 |
| 2012/0133080 | A1 | 5/2012 | Moussa et al. |
| 2012/0289946 | A1 | 11/2012 | Steger |

(56) References Cited

U.S. PATENT DOCUMENTS

| | | |
|---|---|---|
| 2013/0009338 A1 | 1/2013 | Mayer |
| 2013/0048152 A1 | 2/2013 | Na et al. |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1* | 10/2013 | Teulet .................. B22F 3/1055 264/497 |
| 2013/0280547 A1 | 10/2013 | Brandl et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0010968 A1 | 1/2014 | Prest et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0203622 A1 | 7/2014 | Yamamoto et al. |
| 2014/0213384 A1 | 7/2014 | Johnson et al. |
| 2014/0224050 A1* | 8/2014 | Hofmann ............... B22D 25/02 74/412 R |
| 2014/0227125 A1 | 8/2014 | Hofmann |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0332120 A1 | 11/2014 | Liu et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0044084 A1 | 2/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0165693 A1* | 6/2015 | Sagoo .................. B29C 64/153 419/10 |
| 2015/0209889 A1* | 7/2015 | Peters ............... B23K 26/1423 219/76.14 |
| 2015/0219572 A1* | 8/2015 | Beuth, Jr. ............ B29C 64/393 702/136 |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0323053 A1 | 11/2015 | El-wardany et al. |
| 2015/0352794 A1* | 12/2015 | Nguyen ............... B29C 64/393 700/98 |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0233089 A1 | 8/2016 | Zenou et al. |
| 2016/0242877 A1 | 8/2016 | Bernhard |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1* | 12/2016 | Danger .................... A61C 3/03 |
| 2016/0361897 A1 | 12/2016 | Hofmann et al. |
| 2017/0021417 A1 | 1/2017 | Martin et al. |
| 2017/0121799 A1 | 5/2017 | Hofmann et al. |
| 2017/0137955 A1 | 5/2017 | Hofmann et al. |
| 2017/0144225 A1 | 5/2017 | Hofmann |
| 2017/0211168 A1* | 7/2017 | Liu ......................... C22C 1/002 |
| 2017/0226619 A1 | 8/2017 | Hofmann et al. |
| 2018/0119259 A1 | 5/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0022923 A1 | 1/2019 | Hofmann et al. |
| 2019/0126674 A1 | 5/2019 | Parness et al. |
| 2019/0154130 A1 | 5/2019 | Hofmann et al. |
| 2019/0177826 A1 | 6/2019 | Hofmann et al. |
| 2019/0195269 A1 | 6/2019 | Hofmann et al. |
| 2019/0255635 A1 | 8/2019 | Hänni et al. |
| 2019/0314903 A1 | 10/2019 | Haenle et al. |
| 2020/0000595 A1 | 1/2020 | Jones et al. |
| 2020/0278016 A1 | 9/2020 | Hofmann et al. |
| 2020/0278017 A1 | 9/2020 | Hofmann et al. |
| 2020/0282582 A1 | 9/2020 | Hofmann et al. |
| 2020/0318721 A1 | 10/2020 | Hofmann et al. |

FOREIGN PATENT DOCUMENTS

| | | |
|---|---|---|
| CN | 103153502 A | 6/2013 |
| CN | 203227820 U * | 10/2013 |
| DE | 102010062089 A1 | 5/2012 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 3630395 A1 | 4/2020 |
| JP | 61276762 A | 12/1986 |
| JP | 09121094 | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 5249932 B2 | 7/2013 |
| JP | 2013238278 A | 11/2013 |
| JP | 2013544648 A | 12/2013 |
| JP | 2018149655 A | 9/2018 |
| KR | 101420176 B1 | 7/2014 |
| KR | 1020190119154 A | 10/2019 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |

(56) References Cited

FOREIGN PATENT DOCUMENTS

| WO | 2018223117 A2 | 12/2018 |
|---|---|---|
| WO | 2018223117 A3 | 1/2019 |

OTHER PUBLICATIONS

CN-203227820-U English language translation (Year: 2013).*
Abdeljawad et al., "Continuum Modeling of Bulk Metallic Glasses and Composites", Physical Review Letters, vol. 105, 205503, Sep. 17, 2010, p. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, p. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., Dec. 2009, vol. 24, No. 12, pp. 3611-3619.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs, Oct. 1, 2001.
Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of Zr55AI10Ni5Cu30 alloy", J. Mater Res., Oct. 28, 2011, vol. 26, No. 20, pp. 2642-2652.
Cheng, J. B., "Characterization of mechanical properties of FeCrBSiMnNbY metallic glass coatings", J Mater Sci., Apr. 16, 2009, vol. 44, pp. 3356-3363.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430.
Choi et al., "Tribological behavior of the kinetic sprayed Ni59Ti16Zr20Si2Sn3", Journal of Alloys and Compounds, May 31, 2007, vol. 434-435, pp. 64-67.
Conner et al., "Shear band spacing under bending of Zr-based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, Jan. 20, 2006, vol. 54, pp. 1403-1408.

Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468.
Duan et al., "Tribological properties of Zr41.25Ti13.75Ni10Cu12. 5Be22.5 bulk metallic glasses under different conditions", Journal of Alloys and Compounds, Mar. 2, 2012, 528. pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-377, pp. 276-279.
Fornell et al., "Enhanced mechanical properties and in vitro corrosion behavior of amorphous and devitrified Ti40Zr10Cu38Pd12 metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.
Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Ha et al., "Tensile deformation behavior of two Ti-based amorphous matrix composites containing ductile β dendrites", Materials Science and Engineering A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4.
Haruyama et al., "Volume and enthalpy relaxation in Zr55Cu30Ni5AI10 bulk metallic glass", Acta Materialia, Mar. 2010, vol. 59, pp. 1829-1836.
Hays, C. C., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.
Hofmann, "Shape Memory Bulk Metallic Glass Composites", Science, Sep. 10, 2010, vol. 329, pp. 1294-1295.
Hofmann, D. C., "Development of tough, low-density titanium-based bulk metallic glass matrix composites with tensile ductility", PNAS, Dec. 23, 2008, vol. 105, pp. 20136-20140.

(56) References Cited

OTHER PUBLICATIONS

Hofmann et al., "Designing metallic glass matrix composites with high toughness and tensile ductility", Nature Letters, Feb. 28, 2008, vol. 451, pp. 1085-1090.
Hofmann et al., Improving Ductility in Nanostructured Materials and Metallic Glasses: "Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
International Preliminary Report on Patentability for International Application PCT/US2018/022020, dated Sep. 10, 2019, dated Sep. 19, 2019, 10 Pgs.
International Preliminary Report on Patentability for International Application PCT/US2018/034481, dated Nov. 26, 2019, dated Dec. 5, 2019, 17 Pgs.
International Search Report and Written Opinion for International Application No. PCT/US2018/022020, Search completed Jul. 2, 2018, dated Jul. 3, 2018, 12pgs.
International Search Report and Written Opinion for International Application No. PCT/US2018/034481, Search completed Sep. 10, 2018, dated Sep. 10, 2018, 19pgs.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317.
Johnson et al., "Quantifying the Origin of Metallic Glass Formation", Nature Communications, Jan. 20, 2016, vol. 7, 10313, 7 pgs, doi: 10.1038/ncomms10313.
Jung et al., "Fabrication of Fe-based bulk metallic glass by selective laser melting: A parameter study", Materials and Design, Jul. 30, 2015, vol. 86, pp. 703-708.
Li et al., "Selective laser melting of Zr-based bulk metallic glasses: Processing, microstructure and mechanical properties", Materials and Design, Sep. 21, 2016, vol. 112, pp. 217-226.
Madge, "Toughness of Bulk Metallic Glasses, Metals", vol. 5, Issue 3, pp. 1127-1769, ISSN 2075-4701, Jul. 17, 2015 See p. 1287.
Mahbooba et al., "Additive manufacturing of an iron-based bulk metallic glass larger than the critical casting thickness", Applied Materials Today, Feb. 27, 2018, vol. 11, pp. 264-269.
Pauly et al., "Processing Metallic Glasses by Selective Laser Melting", Materials Today, Jan./Feb. 2013, vol. 16, pp. 37-41.
Sanders et al., "Stability of Al-rich glasses in the Al—La—Ni system", 2006, Intermetallics, 14, pp. 348-351.
Shen et al., "3D printing of large, complex metallic glass structures", Materials and Design, Mar. 2017, vol. 117, pp. 213-222.
Sun et al., "Fiber metallic glass laminates", Dec. 2010, J. Mater. Res., vol. 25, No. 12, pp. 2287-2291.
Hu et al., "Crystallization Kinetics of the Cu47.5Zr74.5Al5 Bulk Metallic Glass under Continuous and Iso-thermal heating", App. Mech. and Materials, vols. 99-100, Sep. 8, 2011, p. 1052-1058.
Huang et al., "Dendritic microstructure in the metallic glass matrix composite Zr56Ti14Nb5Cu7Ni6Be12", Scripta Materialia, Mar. 29, 2005, vol. 53, pp. 93-97.
Huang et al., "Fretting wear behavior of bulk amorphous steel", Intermetallics, Jun. 12, 2011, vol. 19, pp. 1385-1389.
Inoue et al., "Cobalt-based bulk glassy alloy with ultrahigh strength and soft magnetic properties", Nature Materials, Sep. 21, 2003, vol. 2, pp. 661-663.
Inoue et al., "Development and applications of late transition metal bulk metallic glasses", Bulk Metallic Glasses, pp. 1-25, 2008.
Inoue et al., "Developments and applications of bulk metallic glasses", Rev. Adv. Mater. Sci., Feb. 28, 2008, vol. 18, No. 1, pp. 1-9.
Inoue et al., "Preparation of 16 mm diameter Rod of Amorphous Zr65Al7.5Ni10Cu17.5 Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267.
Ishida et al., "Wear resistivity of super-precision microgear made of Ni-based metallic glass", Materials Science and Engineering, Mar. 25, 2007, vol. A449-451, pp. 149-154.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim, Junghwan et al., "Oxidation and crystallization mechanisms in plasma-sprayed Cu-based bulk metallic glass coatings", Acta Materialia., Feb. 1, 2010, vol. 58, pp. 952-962.
Kim et al., "Amorphous phase formation of Zr-based alloy coating by HVOF spraying process", Journal of Materials Science, Jan. 1, 2001, vol. 36, pp. 49-54.
Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.
Kim et al., "Production of Ni65Cr15P16B4 Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307.
Kim et al., "Weldability of Cu54Zr22Ti18Ni6 bulk metallic glass by ultrasonic welding processing", Materials Letters, May 17, 2014, 130, pp. 160-163.
Kobayashi et al., "Fe-based metallic glass coatings produced by smart plasma spraying process", Materials Science and Engineering, Feb. 25, 2008, vol. B148, pp. 110-113.
Kobayashi et al., "Mechanical property of Fe-base metallic glass coating formed by gas tunnel type plasma spraying", ScienceDirect, Surface & Coatings Technology, Mar. 14, 2008, 6 pgs.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158.
Kozachkov et al., "Effect of cooling rate on the volume fraction of B2 phases in a CuZrAlCo metallic glass matrix composite", Intermetallics, Apr. 19, 2013, vol. 39, pp. 89-93.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476.
Kwon et al., "Wear behavior of Fe-based bulk metallic glass composites", Journal of Alloys and Compounds, Jul. 14, 2011, vol. 509S, pp. S105-S108.
Launey et al., "Fracture toughness and crack-resistance curve behavior in metallic glass-matrix composites", Applied Physics Letters, Jun. 18, 2009, vol. 94, p. 241910-1-241910-3.
Launey et al., "Solution to the problem of the poor cyclic fatigue resistance of bulk metallic glasses", PNAS Early Edition, pp. 1-6, Jan. 22, 2009.

(56) References Cited

OTHER PUBLICATIONS

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.

Lee et al., "Nanomechanical properties of embedded dendrite phase and its influence on inelastic deformation of Zr55Al10Ni5Cu30 glassy alloy", Materials Science and Engineering A, Mar. 25, 2007, vol. 375, pp. 945-948.

Li et al., "Wear behavior of bulk Zr41Ti14Cu12.5Ni10Be22.5 metallic glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs, Jul. 1, 2008.

List, A. et al., "Impact Conditions for Cold Spraying of Hard Metallic Glasses", Journal of Thermal Spray Technology, Jun. 1, 2012, vol. 21, No. 3-4, pp. 531-540.

Liu, X. Q., "Microstructure and properties of Fe-based amorphous metallic coating produced by high velocity axial plasma spraying", Science Direct, Journal of Alloys and Compounds, Apr. 23, 2009, vol. 484, pp. 300-307.

Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.

Liu et al., "Metallic glass coating on metals plate by adjusted explosive welding technique", Applied Surface Science, Jul. 16, 2009, vol. 255, pp. 9343-9347.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear behavior of a Zr-based bulk metallic glass and its composites", Journal of Alloys and Compounds, May 5, 2010, vol. 503, pp. 138-144.

Lupoi, R. et al., "Deposition of metallic coatings on polymer surfaces using cold spray", Science Direct, Surface & Coatings Technology, Sep. 6, 2010, vol. 205, pp. 2167-2173.

Ma et al., "Wear resistance of Zr-based bulk metallic glass applied in bearing rollers", Materials Science and Engineering, May 4, 2004, vol. A386, pp. 326-330.

Maddala et al., "Effect of notch toughness and hardness on sliding wear of Cu50Hf41.5A18.5 bulk metallic glass", Scripta Materialia, Jul. 6, 2011, vol. 65, pp. 630-633.

Narayan et al., "On the hardness and elastic modulus of bulk metallic glass matrix composites", Scripta Materialia, Jun. 9, 2010, vol. 63, Issue 7, pp. 768-771.

Nl et al., "High performance amorphous steel coating prepared by HVOF thermal spraying", Journal of Alloys and Compounds, Jan. 7, 2009, vol. 467, pp. 163-167, Nov. 29, 2007.

Nishiyama, N. et al., "Recent progress of bulk metallic glasses for strain-sensing devices", Materials Science and Engineering: A, vols. 449-451, Mar. 25, 2007, 79-83.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.

Parlar et al., "Sliding tribological characteristics of Zr-based bulk metallic glass", Intermetallics, Jan. 2008, vol. 16, pp. 34-41.

Pauly et al., "Modeling deformation behavior of Cu—Zr—Al bulk metallic glass matrix composites", Applied Physics Letters, Sep. 2009, vol. 95, p. 101906-1-101906-3.

Pauly et al., "Transformation-mediated ductility in CuZr-based bulk metallic glasses", Nature Materials, May 16, 2010, vol. 9, Issue 6, pp. 473-477.

Ponnambalam et al.., "Fe-based bulk metallic glasses with diameter thickness larger than one centimeter", J Mater Res, Feb. 17, 2004. vol. 19, pp. 1320-1323.

Porter et al., "Incorporation of Amorphous Metals into MEMS for High Performance and Reliability", Rockwell Scientific Company, Final Report, Nov. 1, 2003, 41 pgs.

Prakash et al., "Sliding wear behavior of some Fe-, Co-and Ni-based metallic glasses during rubbing against bearing steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.

Ramamurty et al., "Hardness and plastic deformation in a bulk metallic glass", Acta Materialia, Feb. 2005, vol. 53, pp. 705-717.

Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.

Rigney et al., "The Evolution of Tribomaterial During Sliding: A Brief Introduction", Tribol. Lett, Jul. 1, 2010, vol. 39, pp. 3-7.

Roberts et al., "Cryogenic Charpy impact testing of metallic glass matrix composites", Scripta Materialia, Nov. 11, 2011, 4 pgs.

Schuh et al., "A survey of instrumented indentation studies on metallic glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138.

Shen et al., "Exceptionally high glass-forming ability of an FeCoCrMoCBY alloy", Applied Physics, Apr. 5, 2005, vol. 86, p. 151907-1-151907-3.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685.

Song et al., "Strategy for pinpointing the formation of B2 CuZr in metastable CuZr-based shape memory alloys", Acta Materialia, Aug. 6, 2011, vol. 59, pp. 6620-6630.

Sundaram et al., "Mesoscale Folding, Instability, and Disruption of Laminar Flow in Metal Surfaces", Physical Review Letters, Sep. 7, 2012, vol. 109, p. 106001-1-106001-5.

Szuecs et al., "Mechanical Properties of Zr56.2Ti13.8Nb5.0Cu6.9Ni5.6Be12.5 Ductile Phase Reinforced Bulk Metallic Glass Composite", Acta Materialia, Feb. 2, 2001, vol. 49, Issue 9, pp. 1507-1513.

Tam et al., "Abrasion resistance of Cu based bulk metallic glasses", Journal of Non-Crystalline Solids, Oct. 18, 2004, vol. 347, pp. 268-272.

Tam et al., "Abrasive wear of Cu60Zr30Ti10 bulk metallic glass", Materials Science and Engineering, Apr. 1, 2004, vol. A384 pp. 138-142.

Tan et al., "Synthesis of La-based in-situ bulk metallic glass matrix composite", Intermetallics, Nov. 2002, vol. 10, Issues 11-12, pp. 1203-1205.

Tao et al., "Effect of rotational sliding velocity on surface friction and wear behavior in Zr-based bulk metallic glass", Journal of Alloys and Compounds, Mar. 4, 2010, vol. 492, pp. L36-L39.

Tao et al., "Influence of isothermal annealing on the micro-hardness and friction property in CuZrAl bulk metallic glass", Advanced Materials Research, Jan. 1, 2011, vols. 146-147, pp. 615-618.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in studying the fatigue behavior of Zr-based bulk-metallic glasses and their composites", Intermetallics, Mar. 6, 2009, vol. 17, pp. 579-590.

Wikipedia, "Harmonic Drive", printed Feb. 20. 2014, 4 pgs.

Wu et al., "Bulk Metallic Glass Composites with Transformation-Mediated Work-Hardening and Ductility", Adv. Mater., Apr. 26, 2010, vol. 22, pp. 2770-2773.

(56) References Cited

OTHER PUBLICATIONS

Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al., "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, vol. 26, No. 10, May 28, 2011; abstract; p. 1263, paragraphs 2-3; p. 1265, col. 2, paragraph 2.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, p. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
Extended European Search Report for European Application No. 14889035.3, Search completed Dec. 4, 2017, dated Dec. 13, 2017, 10 Pgs.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
International Preliminary Report on Patentability for International Application PCT/US2018/035813, Report dated Dec. 3, 2019, dated Dec. 12, 2019, 9 pgs.
International Preliminary Report on Patentability for International Application PCT/US2018/034924, Report dated Nov. 26, 2019, dated Dec. 5, 2019, 13 pgs.
International Search Report and Written Opinion for International Application No. PCT/US2018/034924, Search completed Sep. 18, 2018, dated Sep. 19, 2018, 15 pgs.
International Search Report and Written Opinion for International Application No. PCT/US2018/035813, Search completed Dec. 12, 2018, dated Dec. 12, 2018, 11 pgs.
Byrne et al., "Bulk Metallic Glasses", Science, Jul. 25, 2008, vol. 321, pp. 502-503.
Dai et al., "High-performance bulk Ti_13 Cu—Ni—Sn—Ta nanocomposites based on a dendrite-eutectic microstructure", Journal of Materials Research, Sep. 2004, vol. 19, No. 9, pp. 2557-2566.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476.
Guo et al., "Tensile ductility and necking of metallic glass", Nature Materials, Oct. 2007, vol. 6, pp. 735-739.
He et al., "Novel Ti-base nanostructure-dendrite composite with enhanced plasticity", Nature Materials, Jan. 2003, Published Dec. 8, 2002, vol. 2, doi: 10.1038/nmat792. pp. 33-37.
Kim et al., "Design and synthesis of Cu-based metallic glass alloys with high glass forming ability", Journal of Metastable and Nanocrystalline Materials, Sep. 1, 2005, vols. 24-25, pp. 93-96.
Kumar et al., "Embrittlement of Zr-based Bulk Metallic Glasses", Science Direct, Acta Materialia, Year 2009, vol. 57, pp. 3572-3583.
Lin et al., "Designing a toxic-element-free Ti-based amorphous alloy with remarkable supercooled liquid region for biomedical application", Intermetallics, Jul. 9, 2014, vol. 55, pp. 22-27.
Lu et al., "Crystallization Prediction on Laser Three-Dimensional Printing of Zr-based Bulk Metallic Glass", Journal of Non-Crystalline Solids, Year 2017, vol. 461, pp. 12-17.
Whang et al., "Microstructures and age hardening of rapidly quenched Ti—Zr—Si alloys", Journal of Materials Science Letters, 1985, vol. 4, pp. 883-887.
Yokoyama et al., "Tough Hypoeutectic Zr-Based Bulk Metallic Glasses", Metallurgical and Materials Transactions, Year 2011, vol. 42A, pp. 1468-1475.
Extended European Search Report for European Application No. 18806700.3, Search completed Oct. 20, 2020, dated Oct. 28, 2020, 7 pgs.
Final Office Action on U.S. Appl. No. 14/163,936, dated Mar. 10, 2016, 13 pgs.
Non-Final Office Action on U.S. Appl. No. 14/163,936, dated Sep. 10, 2015, 10 pgs.
Notice of Allowance on U.S. Appl. No. 14/163,936, dated Oct. 13, 2016, 10 pgs.
Adharapurapu et al. "Fracture of Ti-Al3Ti metal-intermetallic laminate composites: Effects of lamination on resistance-curve behavior", Metallurgical and Materials Transactions A, Nov. 2005, vol. 36A, 3217-3236.
Demetriou, et al. "Glassy Steel Optimized for Glass-Forming ability and toughness", Applied Physics Letters 95, 041907, DOI: 10.1063/1.3184792.
Roberts "Developing and Characterizing Bulk Metallic Glasses for Extreme Applications", XP055731434, Retrieved from the Internet

(56) References Cited

OTHER PUBLICATIONS (Dec. 16, 2013): URL:https://thesis. library.caltech.edu/8049/141/Scott_Roberts_thesis_2013_Complete Thesis.pdf [retrieved on Sep. 17, 2020], 161 pgs.

Zheng et al. "Processing and Behavior of Fe-Based Metallic Glass Components via Laser-Engineered Net Shaping", Metallurgical and Materials Transactions A, 40A, 1235-1245, DOI: 10.1007/s11661-009-9828-y.

* cited by examiner

Prior Art

Prior Art

FIG. 11

| Material | Density (g/cc) | Stiffness E (GPa) | Tensile Yield (MPa) | Tensile UTS (MPa) | Elongation (%) | Specific Strength | Hardness (HRC) | Fracture Toughness (MPa·m^1/2) | Fatigue Limit(%) (σ/UTS) | Wear Resistance | Softing Temp (°C) |
|---|---|---|---|---|---|---|---|---|---|---|---|
| SS 15500 H1024 | 7.8 | 200 | 1140 | 1170 | 12 | 146 | 36 | 100-150 | 25 | good | >1400 |
| Ti-6Al-4V STA | 4.4 | 114 | 965 | 1035 | 8 | 219 | 41 | 40 | 25 | poor | >1800 |
| Nitinol 60 CW | 7.6 | 179 | 1241 | 1379 | 10 | 163 | 40 | 100-150 | 25 | good | >1400 |
| Vascomax C300 | 8.0 | 190 | 1897 | 1966 | 10 | 237 | 50 | 100-150 | 25 | excellent | >1400 |
| Zr-Be-Based BMG | 6.1 | 97 | 1800 | 1800 | 0.2 | 295 | 60 | 50-100 | 10 | excellent | 700-800 |
| Ti BMG Composite | 5.2 | 94 | 1362 | 1700 | 13 | 325 | 51 | 50-150 | 25 | good | 700-800 |

METHODS FOR FABRICATING STRAIN WAVE GEAR FLEXSPLINES USING METAL ADDITIVE MANUFACTURING

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

CROSS-REFERENCE TO RELATED APPLICATIONS

The present application claims pariority to U.S. Provisional Application No. 62/469,997 filed Mar. 10, 2017, the disclosure of which is incorporated herein by reference in its entirety.

FIELD OF THE INVENTION

The present invention generally relates to methods for the fabrication of strain wave gears using additive manufacturing technology.

BACKGROUND OF THE INVENTION

Strain wave gears, also known as a harmonic drives (HDs), are gear systems that rely on the elastic flexing of one of its members. Typically, a strain wave gear has two sets of slightly off-set gear teeth, which meet and transmit torque through the flexing of one of the gear components. Accordingly, these gearing systems can provide high reduction ratios, high torque-to-weight and torque-to-volume ratios, near-zero backlash (which mitigates the potential wearing of the components), and a host of other benefits. For example, many of HDs' beneficial characteristics make their use critical in robotics applications and, indeed, HDs are widely used in robotics as a method for achieving high gear reductions and for driving force transmissions. More specifically, the beneficial properties and features of HDs include, among others: high-speed reduction ratios of 1/30 to 1/320 (relative to gearing systems), which provide high efficiency gearing without using complex mechanisms; nearly zero backlash in operation; extremely high precision; high torque capacity due to the use of fatigue resistance steel in the flexspline component; high efficiency; and small number of components that assemble easily. Moreover, HDs can achieve all these benchmarks in a very small form factor and can be very light weight.

Due to various functionality-specific constraints, heritage strain wave gears have largely been fabricated from steel via machining. In some instances, when materials strength can be sacrificed in favor of lower manufacturing costs, harmonic drives are fabricated from thermoplastic materials, such as polymers, which can be cast into the shapes of the constituent components, including via inexpensive injection molding processes.

Metal additive manufacturing, also commonly known as 3D printing, is an emerging manufacturing technology which is being rapidly integrated into commercial applications, such as fabrication of nozzles in aircraft and rocket engines. The most common forms of metal additive manufacturing are based on either powder bed systems or powder feed systems. In 3D printing based on powder bed systems, a laser or electron beam melts a thin layer of metal powder and continuously applies it to construct the part, which becomes buried in the powder. The most common forms of powder bed systems are direct metal laser sintering (DMLS) or selective laser melting (SLM). In contrast, in printing systems based on powder feed systems, metal powder is blown into a laser or electron beam and deposited as a metal pool. In addition, there exist 3D printing systems in which a metal is deposited directly from a building head in the absence of a powder bed. Such bed-less technologies are termed directed energy deposition (DED), of which the most common form is laser engineered net shaping (LENS).

SUMMARY OF THE INVENTION

Embodiments of the invention are directed to methods for fabricating a strain wave gear flexspline.

Many embodiments of methods for the manufacture of flexsplines use a metal additive manufacturing system to form an entirety of the strain wave gear flexspline as a single piece, wherein the strain wave gear flexspline is a cylindrical cup including:
- a bottom defining a circumference, a cup wall disposed atop the bottom and defining a cylindrical volume, and gear teeth disposed on an upper outer surface of the cup wall's edge, wherein
- the cup wall has a thickness of between 0.05 and 2 mm, and
- the cup wall having a height that is at least 50 times larger than the smallest thickness of the cup wall; and
- wherein the strain wave gear flexspline is fabricated in a vertical orientation, such that the bottom is disposed on a build platform and the cup wall is oriented perpendicularly to the build platform of the metal additive manufacturing system at all times during fabrication, and the properties of the strain wave gear flexspline in any single deposition layer are the same and are axially symmetric.

In other embodiments the strain wave gear flexspline is attached to the building platform for support during fabrication only at the bottom and no supporting material is added to the cup wall during fabrication.

In still other embodiments the feature sizes of the strain wave gear flexspline are less than 1 mm in dimension.

In yet other embodiments the metal additive manufacturing system is selected from the group consisting of: powder bed fusion printing, powder bed selective laser melting, direct energy deposition printing, metal extrusion, fused filament modeling, metal binder jetting, wire arc additive manufacturing, ultrasonic additive manufacturing, thermal spray additive manufacturing, liquid jetting, laser sintering, electron beam freeform, laser melting, or any combination thereof.

In still yet other embodiments the thickness of the cup wall is within 15% of the spot size of the laser of the metal additive manufacturing system.

In still yet other embodiments the cup wall is fabricated using a single width of the laser scanning of the metal additive manufacturing system or a single wire deposition extrusion process.

In still yet other embodiments at least one of the properties, composition, or microstructure of the strain wave gear flexspline are uniform in the direction parallel to the building platform but vary in the directing perpendicular to the building platform.

In still yet other embodiments the strain wave gear flexspline has a horizontally laminated structure such that the strain wave gear flexspline has a 10% higher fracture toughness than a strain wave gear flexspline made of monolithic metal.

In still yet other embodiments the strain wave gear flexspline is fabricated from a material with a fracture toughness between 30 and 150 MPa m$^{1/2}$. In some such embodiments the fracture toughness of the material is variable along the direction perpendicular to the building platform.

In still yet other embodiments the elastic limit of the strain wave gear flexspline ranges from 0.1-2%.

In still yet other embodiments the strain wave gear flexspline comprises at least two regions with the same chemical composition but distinct physical properties disposed along the direction perpendicular to the building platform.

In still yet other embodiments the strain wave gear flexspline comprises at least two regions of distinct chemical compositions disposed along the direction perpendicular to the building platform.

In still yet other embodiments a gear teeth region of the strain wave gear flexspline comprising the gear teeth comprises a material that is chemically, physically, or both, distinct from the rest of the strain wave gear flexspline, and wherein the gear teeth region is more resistant to wear than the rest of the strain wave gear flexspline.

In still yet other embodiments a gear teeth-less region of the strain wave gear flexspline that excludes gear teeth comprises a material that is chemically, physically, or both, distinct from the gear teeth region of the strain wave gear flexspline, and wherein the gear teeth-less region is more resistant to fracture than the rest of the strain wave gear flexspline.

In still yet other embodiments a material used in the fabrication of the strain wave flexspline is introduced from the building head rather than from a bed of metal.

In still yet other embodiments the metal additive manufacturing system utilizes a material in one of the forms chosen from the group consisting of: powder, wire, molten metal, liquid metal, metal in a binder, metal in dissolvable inks, metal bound in polymer, sheet metal, any other printing form allowing vertical printing, or any combination thereof.

In still yet other embodiments the gear teeth have a vertically oriented curvature.

In still yet other embodiments the strain wave gear flexspline undergoes a post-fabrication process selected from the group consisting of:
  chemical treatment to smooth the surface of the gear teeth and the inner surface of the cup wall;
  mechanically grinding, sanding or polishing to reduce surface roughness;
  coating with another metal;
  heat treating to alter one or more properties chosen from the group consisting of physical properties, porosity, temper, precipitate growth, other properties as compared to the as-fabricated state; and
  any combination thereof.

In still yet other embodiments the strain wave gear flexspline is fabricated from an alloy, a bulk metallic glass or metallic glass composite based on one or more elements chosen from the group consisting of: Fe, Ni, Zr, Ti, Cu, Al, Nb, Ta, W, Mo, V, Hf, Au, Pd, Pt, Ag, Zn, Ga, Mg, or any combination thereof.

In still yet other embodiments the strain wave gear flexspline is fabricated from a metal matrix composite, and wherein the volume fraction or the chemical composition of the metal matrix composite, or both, is uniform in the direction parallel to the building platform but variable in the directing perpendicular to the building platform.

In still yet other embodiments the strain wave gear flexspline is fabricated from both a crystalline metal alloy and a metallic glass alloy, and wherein the two materials are interchanged in the directing perpendicular to the building platform.

In still yet other embodiments the strain wave gear flexspline is fabricated from a high melting temperature alloy with a melting temperature greater than 1,500 Celsius. In some such embodiments the high melting temperature alloy is Inconel or an alloy based on one of the elements chosen from the list: Nb, Ta, W, Mo, V, any combination thereof.

In still yet other embodiments the gear teeth can have a curved or arbitrary shape so that the performance of the strain wave gear can be enhanced or modified for a particular application.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 6a and 6b illustrate various print orientations of typical additive manufacturing processes in accordance with prior art, wherein FIG. 6a shows a standard build platform of a powder bed fusion (PBF) metal additive manufacturing system, wherein parts are shown in vertical (z-direction) and horizontal directions of printing; and FIG. 6b shows a schematic for a powder bed fusion printer, wherein parts are tilted at an angle and support material is added to the parts during printing.

FIG. 11 provides a table showing properties of metal alloys that could be used for fabrication of the flexsplines in accordance with embodiments, as well as the variety of properties that can be achieved in such flexsplines.

FIG. 13b compares micrometer readings (wall thinness) flexsplines that are machined (left) and printed (right); FIG. 13c shows the difference in roughness between the teeth on a printed flexspline (left) and a heritage machined flexspline (right); and FIG. 13d shows the difference between flexsplines printed using embodiments of the invention (left & center), and a flexspline using conventional heating and recoating techniques (right).

DETAILED DISCLOSURE

Turning to the drawings and data, methods for the facile and efficient fabrication of metal flexsplines for use in harmonic drives are provided. It will be understood that the embodiments of the invention described herein are not intended to be exhaustive or to limit the invention to precise forms disclosed. Rather, the embodiments selected for description have been chosen to enable one skilled in the art to practice the invention.

Figure 1:
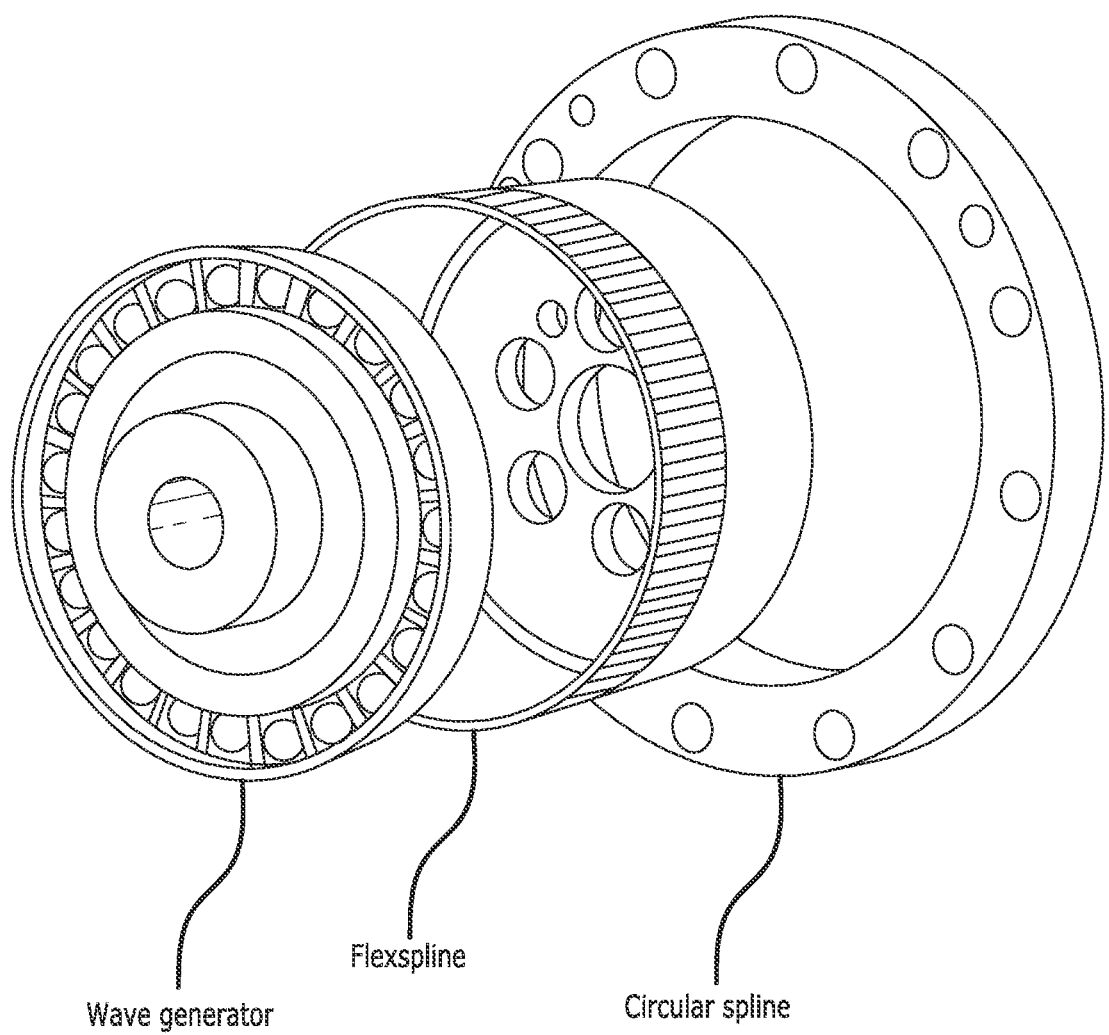
FIG. 1 illustrates the design and components of a typical harmonic drive in accordance with the prior art.

Harmonic drives were developed to take advantage of the elastic dynamics of metals, particularly the expansion of a metal ring to engage gear teeth without exceeding the elastic limit of the ring, which would cause permanent (i.e. plastic) deformation. To this end, a typical HD is made of three components (as shown in FIG. 1): a wave generator, a flexspline (also known as "inner race"), and a circular spline (also known as "outer race"). The wave generator is an elliptical can with small ball-bearings built into the outer circumference and is usually attached to the input shaft. As shown in the figure, the flexspline itself is a thin-walled metal cup with external gear teeth at its rim and a diaphragm at the bottom of the cup for connecting to an output shaft. The circular spline is a ring with internal teeth and is usually fixed to a casing. The circular spline has more (e.g. two more) teeth than the flexspline and its diameter is slightly larger than the flexspline's, such that if they were put together without the wave generator, they would be concentric and their teeth wouldn't touch.

Figure 2:
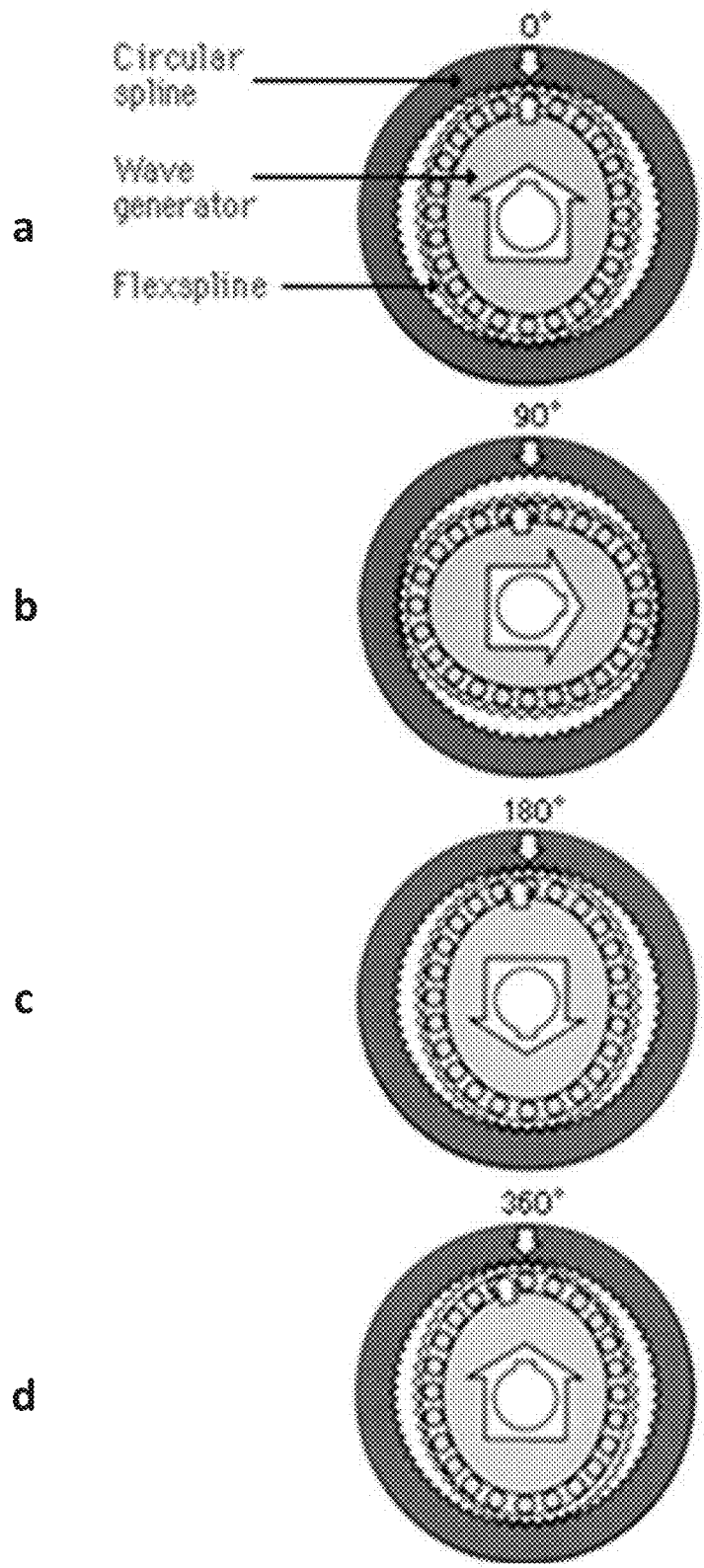
FIGS. 2a-d provide detailed illustration of a harmonic drive's operation in accordance with the prior art.

FIGS. 2a-d illustrate operations of a typical harmonic drive. As shown, first, the flexspline is deflected by the motion of the elliptical wave generator into an elliptical shape causing the flexspline teeth to engage with the cooperative teeth of the circular spline at the major axis of the wave generator ellipse, with the teeth completely disengaged across the minor axis of the ellipse (FIG. 2a). Next, as the wave generator is rotated clockwise with the circular spline fixed, the flexspline is subjected to elastic deformation and its tooth engagement position moves by turns relative to the circular spline (FIG. 2b). When the wave generator rotates 180 degrees clockwise, the flexspline moves counterclockwise by one tooth relative to the circular spline (FIG. 2c). Finally, when the wave generator rotates one revolution clockwise (360 degrees), the flexspline moves counterclockwise by two teeth relative to the circular spline because the flexspline has two fewer teeth than the circular spline (FIG. 2d). In general terms, this movement is treated as output power. It should also be noted that, in some alternative arrangements, the flexspline is held fixed, and the circular spline is used to provide an output torque.

Accordingly, as can be inferred, the operation of a strain wave gear is particularly nuanced and relies on a very precisely engineered gearing system. Therefore, the geometries of the constituent parts of strain wave gears must be fabricated with extreme accuracy in order to provide the desired operation. Moreover, the strain wave gear components must be fabricated from materials that can provide for the desired functionality. In particular, the flexspline must be flexible enough to withstand high-frequency periodic deformation, while at the same time being strong enough to accommodate the loads that the strain wave gear is anticipated to be subjected to.

One material that has been demonstrated to possess the requisite properties for use in strain wave gears is wrought steel, which can also be precisely machined into the desired geometries. However, machining of strain wave gear components from steel is difficult and very expensive, especially for manufacturing of elliptical wave generators and thin-walled flexsplines. In particular, the wall of a flexspline must be thin enough to be able to flex elastically millions of times, while still being mechanically robust enough to transmit torque. Typically, the wall of the flexspline is at least <2 mm thick, in most cases <1.5 mm thick, in many cases <1 mm thick, and can be as low as 0.05 mm thick. For example, the wall of the steel flexspline in a common CSG-20 strain wave gear with a roughly 50 mm diameter (produced by Harmonic Drive) has to be machined to below 0.4 mm thick. In other instances of even smaller flexsplines, the wall has to be machined to as low as 0.15 mm thick. Moreover, wrought steel machining is expensive, wherein components must be machined from a billet, leaving more than 90% of the initial material as scrap waste.

In some instances, harmonic drives are fabricated from thermoplastic materials. Thermoplastic materials (e.g. polymers) can be cast (e.g. via injection molding processes) into the shapes of the constituent components, and thereby circumvent the expensive machining processes that are typically implemented in manufacturing of steel-based strain wave gears. However, strain wave gears fabricated from thermoplastics are not as strong and wear resistant as strain wave gears fabricated from steel.

Figure 3:
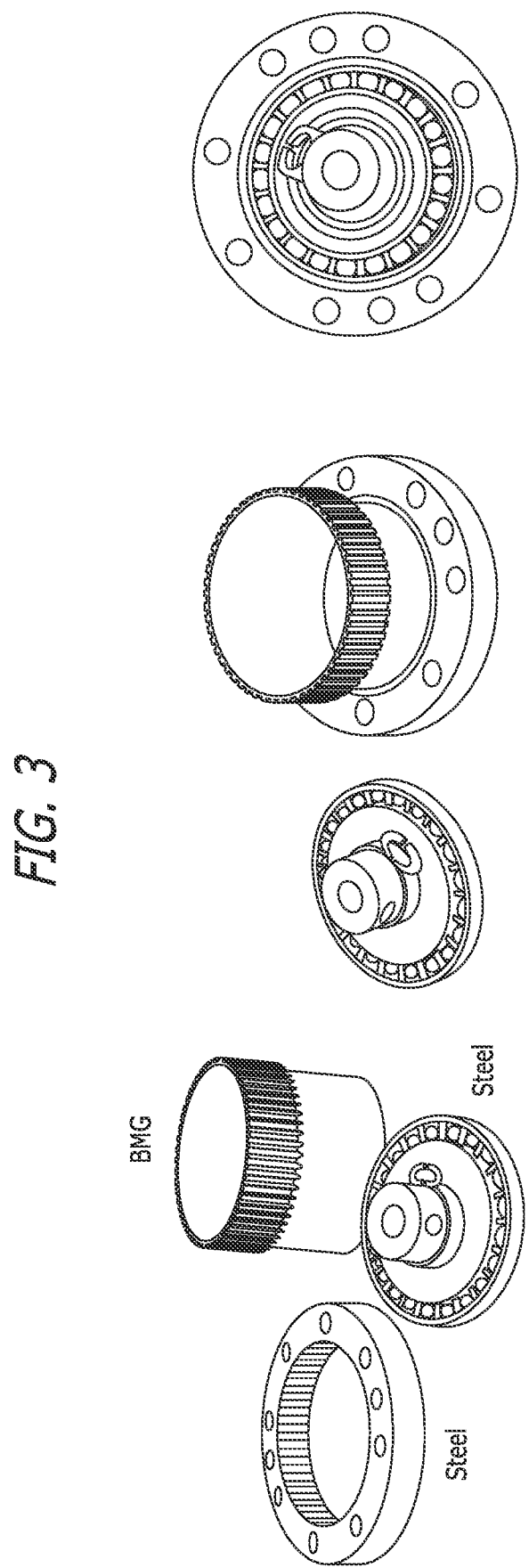
FIG. 3 shows a hybrid steel/BMG strain wave gear, wherein the circular spline and the wave generator components are fabricated from conventional steel and the flexspline is fabricated by casting of BMG in accordance with prior art.

Hofmann et al. have recently disclosed that metal flexsplines can be cast into a near-net shape from bulk metallic glass (BMG). (See, e.g., U.S. patent application Ser. No. 14/177,608, the disclosure of which is incorporated herein by reference.) Here, BMG refers to a complex, precisely composed alloy which can be quenched into a vitreous state at a relatively large casting thickness (generally over 1 mm). More specifically, in stark contrast to conventional metallic materials that have highly ordered atomic structure, metallic glasses, also known as amorphous alloys (or alternatively amorphous metals), are characterized by disordered atomic-scale structure in spite of their metallic constituent elements. Furthermore, an in-situ composite or bulk metallic glass matrix composite (BMGMC) is defined as an alloy which, upon rapid cooling (1-1000 K/s), chemically partitions into two or more phases, one being an amorphous matrix and the other(s) being crystalline inclusions. As such, it will be understood that, in the embodiments of the invention described herein, the term "metallic glass based materials" is understood to mean both BMGs and BMGMCs. In principle, metallic glasses typically possess a number of useful material properties that can allow them to be implemented as highly effective engineering materials. For example, metallic glasses are generally much harder than conventional metals, and are generally tougher than ceramic materials. BMGs are also relatively corrosion resistant, and, unlike conventional glass, they can have good electrical conductivity. Importantly, the manufacture of metallic glass materials lends itself to relatively easy processing and, in particular, the manufacture of a metallic glass can be compatible with an injection molding process or any similar casting process, as demonstrated by Hofmann et al. for a flexspline. For example, FIG. 3 shows a hybrid steel/BMG strain wave gear, wherein the circular spline and wave generator components are fabricated from conventional steel, while the flexspline is cast from BMG. Here, the BMG cast part fits directly into the otherwise steel-made strain wave gear to complete the hybrid gearbox.

Figure 4:
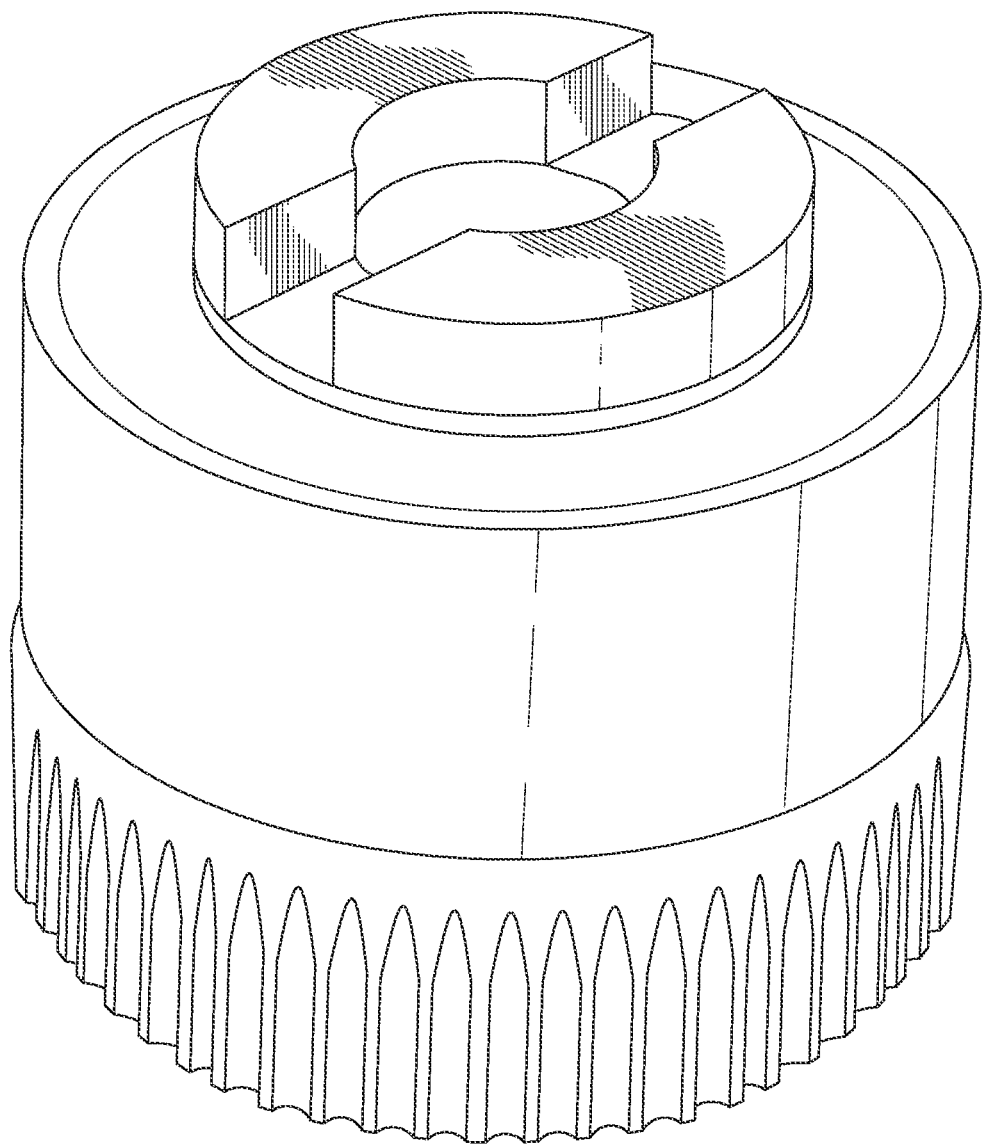
FIG. 4 shows flow lines that can lead to cracks in a flexspline cast from BMG in accordance with prior art.

However, manufacturing of flexsplines via casting of BMGs according to the method disclosed by Hofmann et al., also presents a number of drawbacks. First, the casting process often affects the overall physical properties of the materials being cast, including BMGs. Specifically, the turbulence in the molten material during the casting injection leaves flow marks (FIG. 4) and other defects on the part being cast, which, in turn, result in a weaker, crack-prone part. In fact, the flexsplines cast from BMGs readily crack from casting process caused defects. Second, the thin wall of a flexspline is very difficult to cast. In general, if the thickness of the wall is less than 1 mm it is difficult to get the fluid to flow into such small mold voids, and since the fragility of the walls at such dimension can lead to failure during mold removal. Third, in many instances, gear teeth of flexsplines may have a profile that is not flat, but rather has a curve or another arbitrary shape, as shown schematically in FIG. 5. In such instances, the gear teeth of the flexsplines are slightly curved in the vertical direction, which can result in the whole part getting trapped in the mold during casting. This makes the casting of flexsplines with such curved teeth difficult if not impossible. Fourth, the holes at the bottom of the flexspline, which are required for mounting the flexspline to the rotary elements of the HD, cannot be cast into the flexspline and must be machined or drilled in at a later step, which introduces an extra step in fabrication of flexsplines via casting.

Figure 6A:
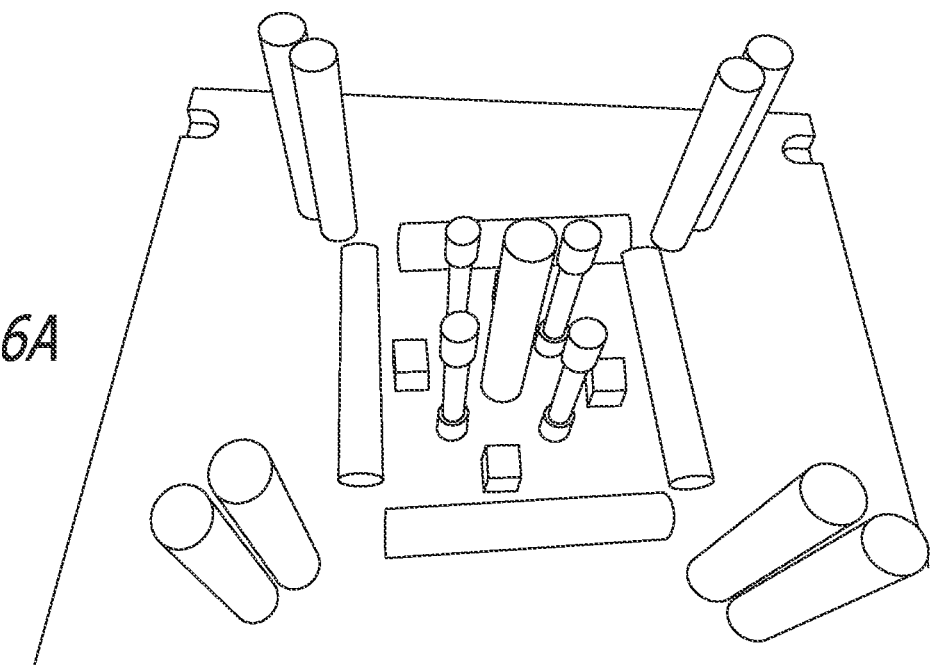
Figure 7:
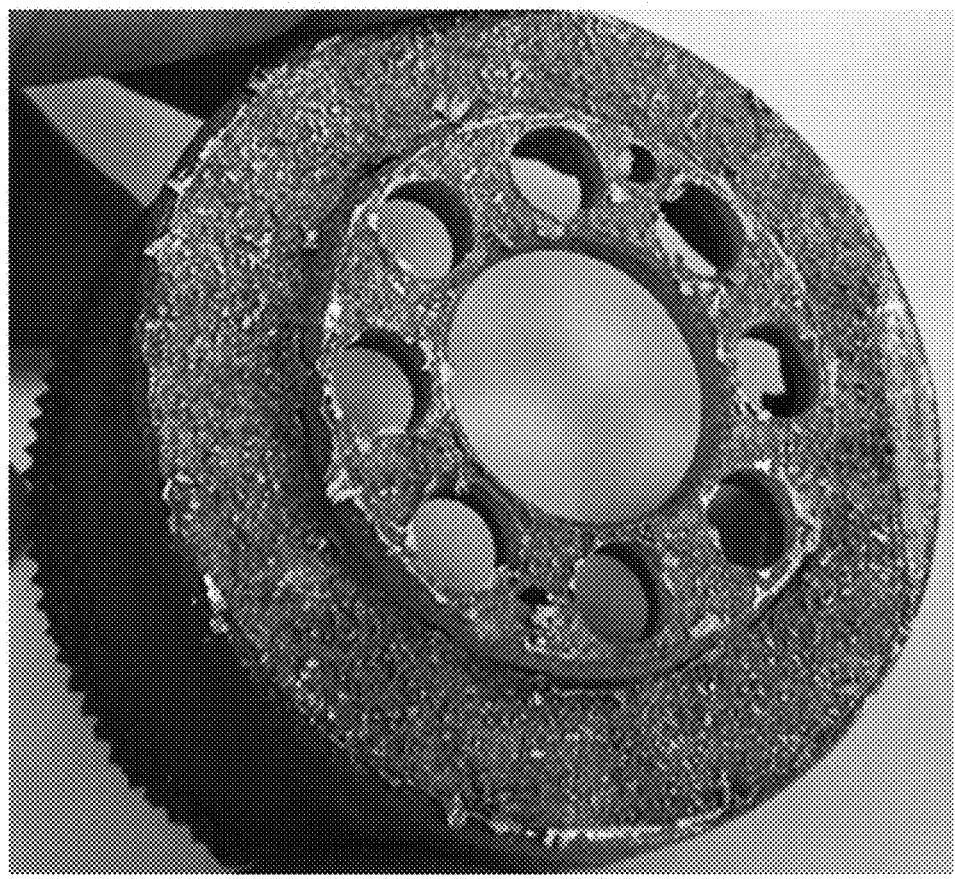
FIG. 7 provides an image of a bottom view of a metal printed, steel flexspline and demonstrates the rough finish resulting from the removal of the supporting material in accordance with embodiments of the invention.

One manufacturing technique that hasn't been explored for manufacturing flexsplines is metal additive manufacturing. Although this manufacturing technology is well-known for printing conventional gears and gear teeth, metal additive manufacturing was believed to be unsuitable for fabrication of thin-walled structures, where the height of the structure is much larger than the wall thickness, such as in an HD flexspline, wherein the cup wall may have a height that is 50 times (or more) larger than the smallest thickness of the cup wall. Specifically, existing DMLS and SLM powder bed machines can only achieve feature tolerances of approximately 0.04 to 0.2 mm, depending on the orientation of the build. Moreover, the orientation in which a part is printed affects not only its build quality, but its mechanical properties as well. To this end, FIG. 6a shows a standard build platform of a powder bed fusion (PBF) metal additive manufacturing system and various orientations of the parts, including standing-on-end (vertical) build orientation, also called the z-direction of printing. In addition, since surfaces parallel to the build platform cannot be supported, they end up with very rough finishes, as, for example, shown in FIG. 7.

Figure 6B:
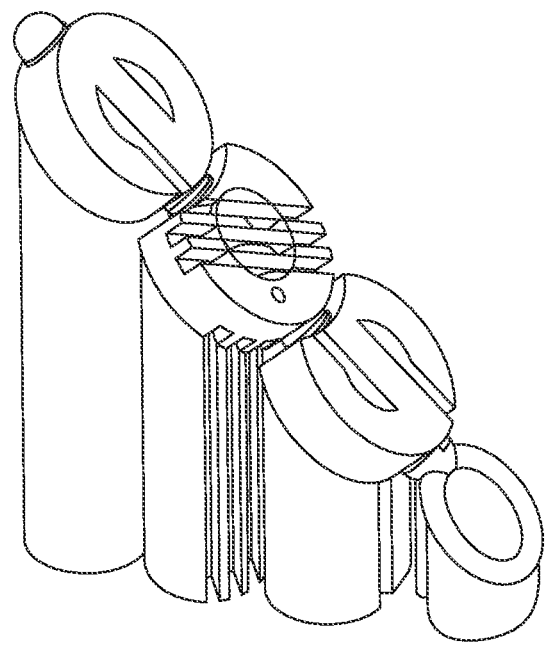

Accordingly, in order to achieve a smooth surface of the conventional techniques, flat surfaces in powder bed metal additive manufacturing machines are positioned at an angle to the build plate, as shown in FIG. 6b. Consequently, the build/print orientation has significant consequences in the manufacture of flexsplines. Specifically, since the mating surfaces of a strain wave gear (i.e., the engaging surfaces of the circular spline and wave generator's teeth and the bottom surface of the flexspline, which mates with the bottom of the wave generator) must be flat and precisely finished, the conventional approach to additively manufacturing these gear components would be to tilt them at an angle relative to the build platform during printing (as shown in FIG. 6b) to improve the bottom surface finish. However, printing the wall and/or the teeth of the flexspline at an angle to the build platform requires the use of support structures and materials (as shown in FIG. 6b). The support material, which is typically also metal and strongly adheres to the printed object and needs to be removed post-fabrication. In turn, the post-fabrication removal of support structures and materials can damage the delicate structures of the flexspline's teeth and wall and is, therefore, highly undesirable. Moreover, any support material remaining stuck to the wall of the cup will change the flexing behavior of the flexspline. Consequently, the teeth and the wall of the cup must be absolutely free from all support material in the fabrication of flexsplines. In addition, 3D printing of flexsplines at an angle hinders the ability to achieve the perfect radial symmetry and gear teeth curvature essential to flexspline's functionality.

As a result of the deficiencies of these conventional additive manufacturing techniques, metal additive manufacturing techniques are currently considered unsuitable for the fabrication of flexsplines and other sensitive to manufacturing components of HDs. In particular, flexspline manufacturing includes at least the following geometrical constraints and considerations: (1) an extreme thinness of the flexspline's wall (e.g., <2 mm or even <1.0 mm, and as low as 0.05 mm), (2) the requisite flatness and smoothness of the mating surface (e.g., the surfaces that must engage with the circular spline and wave generator), (3) the extreme geometrical precision of the gear teeth (e.g., the teeth must be manufactured with a typical tolerance of <100 micrometers and the overall radial (z-axis) symmetry of the flexspline cup, (4) the overall need for geometrical precision of all component surface (e.g., inner surface teeth of the circular spline and the outer teeth of the wave generator). In addition, certain metal additive manufacturing technologies, such as DED, are often unable to achieve a feature size small enough to print a flexspline wall or other flexspline features of the required dimensions, or produce the gear teeth with the correct shape (such as less than 1 mm). Accordingly, no currently available metal additive manufacturing technology appears to be suitable for printing metal flexsplines.

Figure 8:
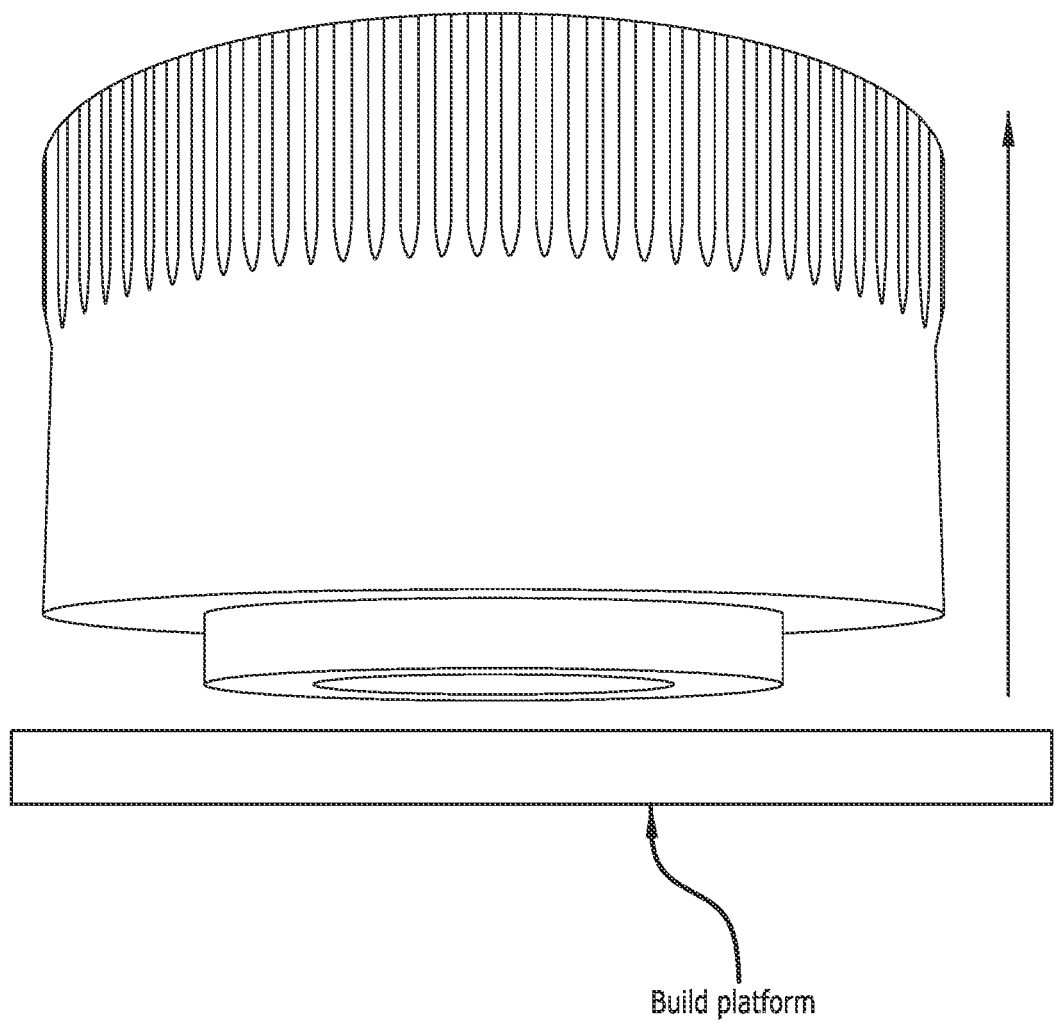
FIG. 8 provides an image of a flexspline fabricated in accordance with embodiments of the invention, wherein an arrow indicates the building direction relative to the build platform.

The current application is directed to embodiments of a method for fabrication of metal strain wave gear flexsplines using a specialized metal additive manufacturing technique. In many embodiments, the method allows the entire flexspline to be metal printed, including all the components: the output surface with mating features, the thin wall of the cup, and the teeth integral to the flexspline. In many embodiments, the flexspline can be used directly upon removal from the build tray. In some such embodiments, during the printing process, the wall of the flexspline is oriented vertically on the build platform (i.e. perpendicularly to the metal material being applied), as shown in FIG. 8. In addition, in many embodiments, the standard building parameters are modified so as to achieve the desired flexspline wall thinness and the precisely defined gear teeth. In many embodiments, the method is well-suited for use with DMLS, SLM, or other systems currently available on the market. In some embodiments, the method may be used with DED systems, wherein the deposition spot size of such system is within 15% of the wall thickness of the desired flexspline. In some embodiments, the metal printed flexspline is further finished via a mechanical or chemical finishing operation. In many embodiments, the entirety of the flexspline is metal printed to a net or near-net shape. In many embodiments, the wall thickness of the flexspline printed according to the method of the application is as low as 0.3 mm. In many embodiments, the method of the application allows for fast, facile, low cost, low waste fabrication of flexsplines of the desired geometry. In some embodiments, the method allows to print multiple flexsplines in a single print. In many embodiments, the method of the application yields significant cost and time savings, as compared to conventional metal machining techniques.

The advantages of metal printing the flexsplines, as opposed to machining them, are significant, even if the part quality is somewhat sacrificed. For example, approximately eighteen 50 mm diameter flexsplines can be printed at one time in less than a 6 hour build time on EOS M290 3D printer with a standard build tray size. In contrast, an automated CNC machining platform of similar size and cost can only produce one flexspline at a time, wherein machining time can be up to an hour and the scrap rate is over 90% of the billet material.

Embodiments of Forming Flexsplines by Additive Manufacturing

Many embodiments are directed to printing systems based on a material deposition method chosen from the list: powder bed fusion (PBF) printing, direct energy deposition (DED) printing, metal extrusion, fused filament modeling, metal binder jetting, wire arc additive manufacturing, ultrasonic additive manufacturing, thermal spray additive manufacturing, liquid jetting, laser sintering, electron beam freeform, laser melting, or another technique that can be used to print the flexspline in the vertical orientation with the build layers perpendicular to the teeth and the cup facing up, any combination thereof. In many such embodiments, the metal additive manufacturing system utilizes a material in one of the forms chosen from the list: powder, wire, molten metal, fluid liquid metal, metal in a binder, metal in dissolvable inks, metal bound in polymer, sheet metal, any other printing form allowing vertical printing, any combination thereof. In many embodiments, the method of the application is especially advantageous for fabrication of flexsplines.

Specifically, in many embodiments, the method of the application allows for the fabrication flexspline walls with thicknesses less than 2 mm down to thicknesses as small as 0.35 mm to be produced without the requirement for the use of support pillars or support materials beyond a bottom supporting build plate. Indeed, using additive manufacturing techniques in accordance with embodiments to fabricate flexsplines with wall thickness less than 2 mm is particularly advantageous. In such embodiments, the wall thickness is on the order of the build beam (e.g., laser spot) such that the melt pool associated with one laser pass is approximately the same width as the wall and the heat affected zone (or process zone) spans the entire wall thickness in all cases. This means that the whole flexspline wall is being processed at the same time instead of in several passes where cold material is being joined to hot material, and the whole thickness of the flexspline wall is heated at once. Accordingly, the method of the application is especially advantageous for fabrication of flexsplines from metallic glass materials. Specifically, the method allows for the formation of a fully amorphous flexspline part without any of concerns about reheating or crystallization of the metallic glass material that can arise with other thermal manufacturing techniques, yielding a flexspline with superior properties.

In order to ensure proper manufacture of flexsplines in accordance with appropriate tolerances, many embodiments of the flexspline manufacturing methods according to the disclosure may include one or more of the following specific manufacturing parameters, which will be discussed in greater detail below:

- The specific orientation of the walls of the flexspline in a vertical direction perpendicular to the build plate (z-direction).
- Positioning the bottom of the cup of the flexspline at the bottom of the build such that no overhangs are formed during fabrication.
- Ensuring that each layer of the flexspline wall is formed in a continuous seamless circle and such that an overall laminate structure of stacked layers is formed.
- Keeping the walls of the flexspline to a thickness small enough such that the melt pool associated with one build beam pass is at least the same size as the wall thickness.
- In cases where optics are immobile, positioning the flexspline close enough to the center of the build plate such that the build beam does not need to be deflected and the circularity of the flexspline can be maintained.
- Altering the material, material state, or build parameter along the vertical direction of the flexspline wall to allow for the fabrication of flexsplines with customized properties.
- Forming the recoater blade of the additive manufacturing apparatus of a soft material (e.g., softer than conventional steel recoater blades) to avoid placing undue stress on the flexspline walls. This modification to conventional additive manufacturing apparatus is particularly important when thin-walled flexsplines are being formed, as will be discussed in greater detail below.

Embodiments Incorporating Vertical Build Orientations

As an initial matter, many embodiments of flexspline additive manufacturing methods are configured such that the flexspline is printed facing upwards, with the thin vertical wall parallel to the z-axis of the build. Although orienting the flexspline vertically to the build platform forces the bottom cup mating surface of the flexspline to face downwards to avoid overhangs, resulting in the mating surface having the roughest surface, such a vertical build orientation allows for the additive manufacture of flexsplines and creates other unexpected advantages.

Figure 5:
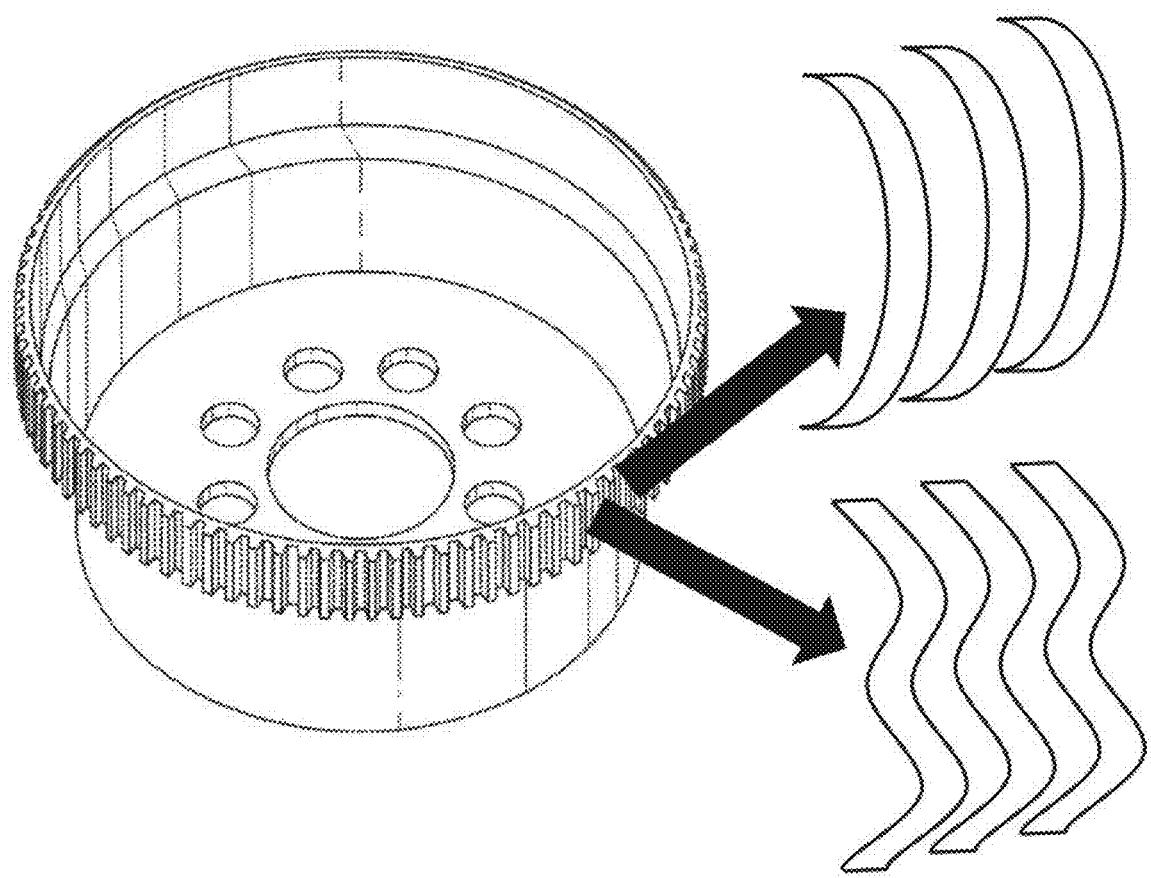
FIG. 5 illustrates flexspline gear teeth having non-flat curvatures in accordance with prior art and embodiments of the invention.

For example, the vertical orientation of the flexspline during the fabrication process allows the precise printing of the gear teeth without the need for support material anywhere on the part, except on the bottom. Moreover, in some instances, when the gear teeth of a flexspline have a profile that is not flat but rather has a curve or another arbitrary shape (as shown in FIG. 5), strictly vertical orientation during fabrication is critical for achieving the exactly same curvature and curve shape, with the exactly same feature size, for each tooth and, thus, properly functional flexsplines. Moreover, as previously discussed, such non-flat teeth can be difficult to form using other manufacturing techniques. In addition, since a flexspline needs to be absolutely circular, printing vertically, according to the method of the application, assures that the wall is concentric to the gear teeth and the output shaft, which is a critical consideration to the proper function of a flexspline. This requirement for absolute circularity is so great that in many embodiments, when the printing system's optics cannot be moved (such as in powder bed fusion printers), embodiments call for the flexspline to be printed near the center of the build platform, so as to avoid the need to deflect the build beam and thus maintain the circularity of the flexspline. In contrast, printing near the edges of the build platform of such systems requires that the laser beam is bent to reach the print area, which, in turn, results in the laser spot size that is not precisely circular.

Furthermore, in many embodiments, the vertical orientation of the flexspline during printing has advantages in terms of enhanced mechanical properties for the resulting flexspline. As is well-known in the art of additive manufacturing, in a 3D printed metal part, the material formed along the z-axis of the print has lower ductility than the material deposited along the x or y planes of the print. However, since the operation of the flexspline mainly relies on the flexing of its wall in the horizontal directions (sideways), the material ductility along flexspline's z-axis (i.e. the direction of the flexspline's print according to the embodiments of the invention) carries less importance to the flexspline's overall functionality.

Figure 9:
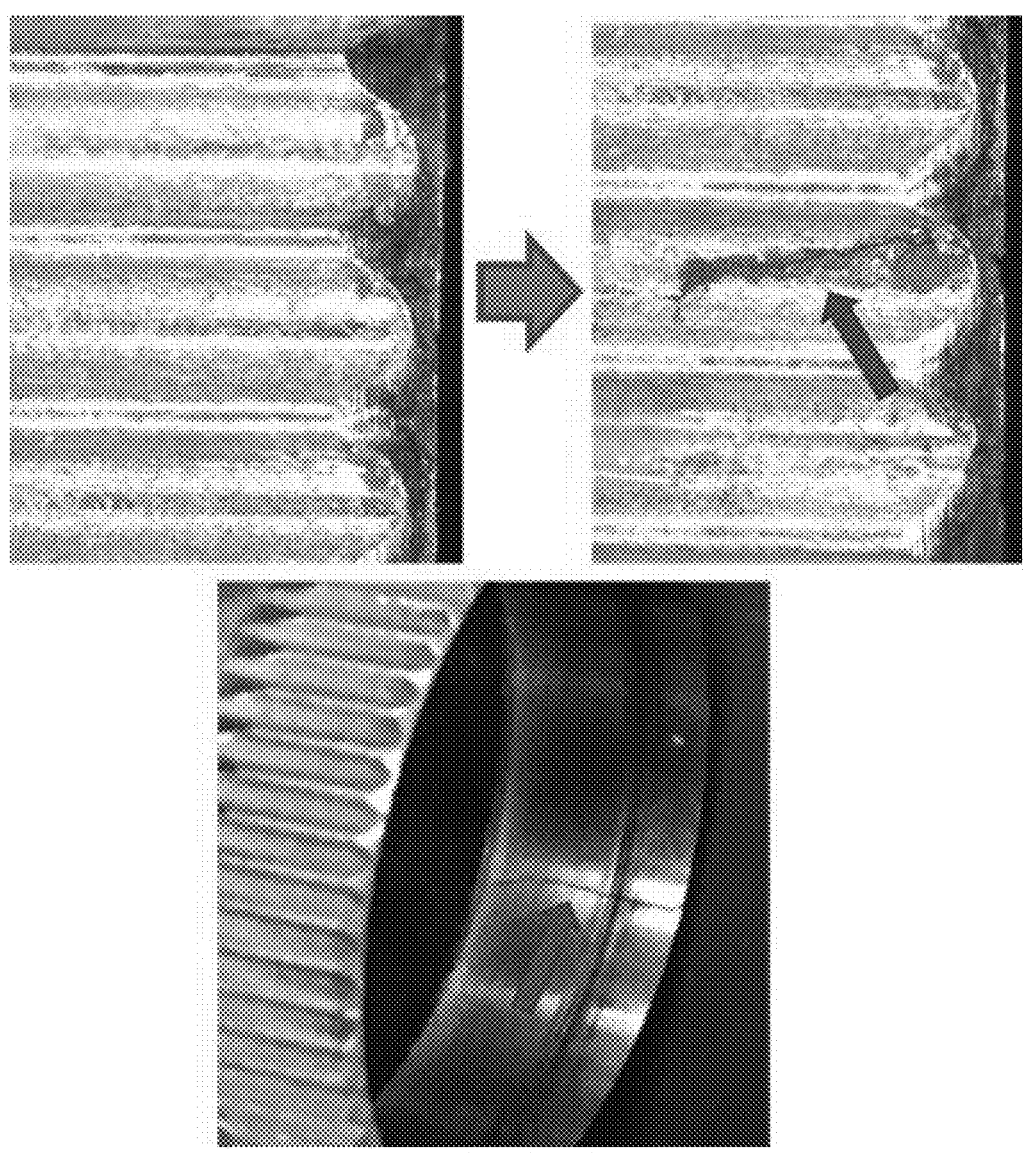
FIG. 9 provides images showing crack propagation forming in a flexspline in accordance with the prior art.
Figure 10:
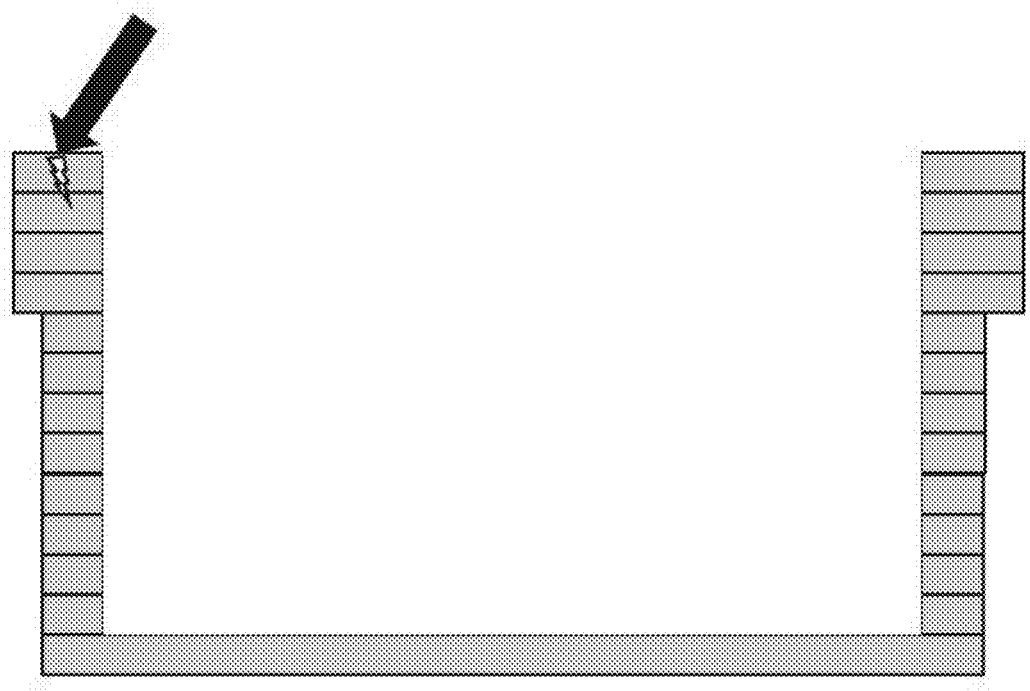
FIG. 10 provides a schematic of the crack inhibition of a laminate flexspline structure in accordance with embodiments of the invention.

In addition, in many embodiments, the vertical orientation of the flexspline during printing according to the method of the application produces fracture resistant flexsplines. Specifically, flexing of the flexspline cup during the strain wave gear operation promotes fracture formation in the cup, wherein the cracks tend to form from the gear teeth down, towards the bottom of the cup, and parallel to the gear teeth alignment (as is clearly seen in FIG. 9). However, the fabrication method of the application produces the flexspline that is, effectively, a crack resistant "laminate" structure comprised of a plurality of vertically stacked 3D printed layers (FIG. 10). More specifically, orienting the flexspline vertically during the fabrication process of the application, turns the flexspline cup into a laminate structure made up of many thin layers (e.g., on the order of 20 microns thick). Here, it should be noted, that it is well-known in the art of additive manufacturing that melting metal materials during the deposition process does not completely erase the distinctions between the deposition layers, and that evidence layering remains detectable in the vertical direction of building. For example, this effect can be seen upon careful inspection of FIG. 8 and FIG. 13c. Accordingly, such "laminate" structures as described herein are unexpectedly advantageous for forming flexsplines as they are resistant to a crack growing through the layers, making it difficult to grow a crack through the laminate. Specifically, the "laminated" printed flexspline of the application has at least a 10% higher fracture toughness than a flexspline made entirely of a monolithic metal alloy.

Furthermore, in many embodiments, the vertical fabrication method of the application produces a stronger flexspline with fewer potential points of failure along its body. Specifically, in many embodiments, as the flexspline is printed vertically, each deposited layer of material may be deposited in a continuous strand of metal (ring) with no attachment/ fusion points along each individual circumference, e.g. one continuous laser pass of melted metal when powder bed system is used. Consequently, there exist no circumference "breaks" in the material layers laminated into the circular flexspline wall, and, therefore, no potential points of failure. It should be noted here that 3D printing processes are known in the art to often produce porous and similarly defective structures, and, that, therefore, they would be expected to produce faulty and weak flexsplines as well. However, since the flexspline is operationally loaded by flexing of the flexspline's cup in XY-plane, and since this load is being applied to the laminate of the continuous "rings" of deposited material (as described herein), which have no fabrication faults in their individual circumferences, the flexsplines fabricated according to the methods of the application unexpectedly demonstrate very strong performance.

Finally, orienting the flexspline vertically during building dictates that the strongest part of the flexspline (the cup's bottom) is attached to the build platform. Most printed flexsplines will have to undergo heat treatment in post-processing to smooth surface roughness or to affect other surface treatments, which tends to warp them. However, printing vertically and attaching the most robust part of the flexspline to the base allows for such flexsplines to be heat treated safely, without causing any deformation of the wall, because the greater part of the flexspline's mass is concentrated in the secured to the platform bottom preventing overheating of the more delicate portions of the flexspline.

Embodiments Incorporating Gear Teeth with Improved Curvature

As previously discussed, prior art manufacturing techniques are disadvantaged in being able to form flexsplines with teeth that do not have a flat profile. Printing in accordance with embodiments allows the teeth on the flexspline to have a profile that is not flat, but rather has a curve or another arbitrary shape (as shown schematically in FIG. 5). In many embodiments, flexsplines incorporating such gear teeth are printed vertically to avoid manufacturing difficulties. For example, in an additive manufacturing technique where an object is printed at an angle, it would be impossible for each tooth to have the same curvature with the same feature size. Accordingly, in many embodiments the gear teeth are not flat but have a curvature. Specifically, as shown in FIG. 5 this means the teeth are actually slightly curved in the vertical direction. As discussed, it has been found that printing is the only way to add this curvature onto the gear teeth without conventional machining. The vertical print orientation, according to embodiments, also avoids some of the problems associated with horizontal build configurations. For example, printing horizontally with powder bed systems limits the printable feature size by the possible thickness of the layer of deposition powder, which is typically about 20 micron. By printing vertically, it is possible to achieve a much finer resolution without creating a "step." This allows for the formation of smaller curves and other shapes on the flexspline teeth that would not be possible if the flexsplines were orientated differently.

Embodiments Incorporating Engineered Heat Effected Zones

In various embodiments, the metal additive manufacturing of flexsplines according to the method of the application, may incorporate flexsplines fabricated in a vertical orientation where the flexspline wall is built with a single pass of the laser per layer, affording flexsplines of better quality. Specifically, since the melt pool associated with one laser pass is approximately the same width as the wall, and since the heat affected zone (or process zone) spans the entire wall thickness, the entirety of the flexspline wall thickness is being processed at the same time, instead of in several passes. Therefore, the method of the application allows to avoid situations, wherein a cold material is being joined to a hot material, and, thus, the whole thickness of the flexspline wall is heated at once. In addition, where metallic glass materials are used this is particularly advantageous as it avoids issues associated with crystallization that may occur during reheating of such metallic glasses.

In many embodiments, the metal additive manufacturing of flexsplines according to the method of the application is rapid. Specifically, the parallel orientation of the flexspline's mating surface against the build plate dictated by the method of the application ensures that most of the metal deposition occurs in the beginning of the printing process. Therefore, since the construction of the thin wall of the flexspline may be configured to require only one pass from the laser (which is as small as 0.38 mm in, for example, an EOS M290) per layer, the vertical building of the flexspline requires very little rastering time and, thus, is extremely rapid. In addition, in many embodiments, modification of the machine parameters results in a flexspline wall thickness that is equal to or less than then spot size of the laser (and in many cases wherein the thickness of the cup wall is within 15% of the spot size of the laser of the metal additive manufacturing system), which, in turn, allows the flexspline to be used in harmonic drives directly after printing. However, in some embodiments, larger diameter flexsplines with proportionally thicker walls are manufactured with more than a single pass of the laser.

Embodiments of Additive Manufacturing Techniques Incorporating Custom Build Parameters In many embodiments, the vertical orientation of the flexspline during 3D printing fabrication results in each print-deposited layer having radial symmetry relative to the cylindrical geometry of the flexspline. Therefore, in such embodiments, each individual deposition layer in the vertically printed flexspline features consistently continuous material properties throughout the layer, wherein the material properties are governed by the user-defined building parameters, such as, for example, laser power and material feed rate. At the same time, the 3D printing systems allow for facile control over the physical properties of the materials in the direction of their deposition (z-direction) during printing, including via material microstructuring.

Specifically, material physical properties such as, for example, the material's grain size, toughness, hardness, fracture toughness, fatigue limit, ductility, and elastic modulus can be controlled and varied in z-direction of the print via adjustments of the building/deposition parameters. Accordingly, printing the flexspline in the z-direction, according to the embodiments of the invention, allows the different sections of the flexspline along the z-axis to exhibit different mechanical properties. For example, in many embodiments, since larger grain size improves the fracture toughness and fatigue limit of a material, this property may be easily introduced/increased (via adjustment of printing parameters) around the region the flexsplines most likely to fail by these modes. For example, in some embodiments the flexspline fabricated according to the method of the application may feature higher wear resistance near the flexspline's teeth and higher resistance to fracturing in the thin wall. Consequently, in contrast to methods based on metal machining, the method of the invention allows for fabrication of flexsplines with "functionally graded" properties.

In other embodiments, by printing the flexspline, it is possible to form microstructures that cannot be made with casting or machining forged billets. Specifically, because the cooling rate is very high, embodiments of the method allow for the formation of flexsplines that are at least partially formed out of metallic glass or out of nanocrystalline metal. Accordingly, the flexspline can have properties that cannot be obtained from other methods.

Embodiments of Additive Manufacturing Techniques Incorporating Variable Materials In many embodiments, the printing method of the application is extendable to directed energy (DED) systems. DED systems offer additional benefits to the method of the application, wherein DED systems allow to vary material composition in the z-direction of printing. Specifically, in contrast to powder bed printers, in directed energy printers the metal is introduced in the build head, and, therefore, the composition of the metal can be changed in the vertical z-direction. Accordingly, DED systems would allow different regions of the flexspline to be printed in different materials. For example, table of FIG. 11 shows the properties of six examples of metal alloys that could be fabricated using the method of the application. These examples include: stainless steel 15-5, Ti-6Al-4V, Nitronic 60 steel, Vascomax C300 maraging steel, Zr-based bulk metallic glass, and Ti-based bulk metallic glass composite. The table also illustrates the combination of properties that can be achieved by printing different parts of the flexspline with different alloys according to many embodiments. As another example, when a DED or similarly functioning system with appropriate laser spot size is used according to the embodiments of the application, a flexspline with teeth made of wear resistant maraging steel and a wall made of a low density titanium alloy can be fabricated. As yet another example, a DED-type system can be used according to some embodiments to fabricate a flexspline, wherein TiC is blended with Ti during the printing of and near the gear teeth portion of the flexspline, so as to create a wear resistant composite selectively in that area of the flexspline. As another example, in some embodiments, the flexspline is vertically printed from two different materials according to the method of the application, so as to have the wall made out of a tough steel, such as 304L alloy, and the gear teeth made out of a wear resistant steel, such as 15-5PH. A table providing a summary of properties for exemplary materials is provided in FIG. 11, however, materials having a fracture toughness between 30 and 150 MPa $m^{1/2}$ and/or an elastic limit between 0.1 and 2% have been shown to be particularly advantageous in forming flexsplines according to embodiments.

Embodiments Incorporating Exotic Materials

In many embodiments, the method of the application allows for fabrication of flexsplines from all the heritage materials currently used in the production of steel flexsplines, including, but not limited to: maraging steel, tool steel, precipitation hardened steel, low carbon steel and high carbon steel. Accordingly, the flexsplines fabricated according to the method of the application can be used with the same HD systems and within the same design parameters as the traditional wrought steel flexsplines. In addition, in some embodiments, the method of the application allows for facile fabrication of flexsplines from alloys that are incompatible with the conventional methods of flexspline fabrication, such as difficult or impossible to machine metal alloys, or alloys that cannot be made in any form larger than powder (such as, for example, marginal glass forming materials and nanocrystalline metals).

In addition, the method of the application can be used to further improve the specific properties of flexsplines prepared from less than optimal materials, wherein adjustments of the printing parameters can, for example, harden materials which would normally be too soft to function well in a flexspline. For example, high strength metals, such as titanium and Inconel, which are typically hard to machine, can be printed into flexsplines in accordance with the method of the application. Furthermore, in some embodiments, the 3D printing method of the application can be used to fabricate flexsplines from metal matrix composites and bulk metallic glasses (also known as amorphous metals), which typically cannot be machined and must be cast in a net shape. Furthermore, in some embodiments, the flexsplines are printed from refractory or other high melting temperature materials, such as Nb, Ta, Mo, W, or V alloys, which are notoriously hard to machine. Ability to print the components from such alloys, could lead to development of strain wave gears capable of operating at extremely high temperatures and enable high-temperature applications for strain wave gears. Accordingly, in many embodiments, the method of 3D printing allows for use of customized metals in fabrication of flexsplines and allows for improved specific properties and manufacturing costs, especially as compared to traditional machining methods.

Embodiments Incorporating Finishing Techniques

In many embodiments, the flexsplines made using metal additive manufacturing of the application can undergo a simple finishing operation to improve the surface roughness or match a dimensional tolerance inexpensively and easily. Accordingly, flexsplines printed according to the method of the application can be mechanically finished through grinding or milling to achieve a smooth surface, including minimal grinding to only remove the roughness from the gear teeth. Furthermore, in many embodiments, the flexspline surfaces can be smoothed using one of processes including (but not limited to): a chemical process, such as etching; a mechanical finish process, such as water blasting; sand or bead blasting; any combination thereof. In many embodiments, the radial symmetry of the flexspline vertically printed according to the method of the application also simplifies and makes post-fabrication processing more effective. For example, in many embodiments, the mating surface of the flexspline has axial symmetry and is easily lathed. In many embodiments, the flexspline's rough surfaces are easily smoothed using a chemical etching process, such as, for example, electrolysis, wherein the flexspline's radial symmetry and uniform thickness ensure even and effective etching. In addition, in many embodiments, the flexspline's radial symmetry also simplifies post-fabrication machining with a computer numerical control milling machine (CNC) by ensuring that a uniform amount of material is removed. More specific examples of post-fabrication treatments that might improve operability of flexsplines of the application include (but are not limited to): chemical treatment to smooth the surface of the gear teeth and the inner surface of the cup wall (for example to reduce the surface roughness to feature size of less than 50 micrometers); treatment with sanding (for example with 240 grit sand paper); mechanically grinding to reduce surface roughness; polishing operation (for example to reduce the surface roughness by at least 25%); coating with another metal; and heat treating to alter one or more properties chosen from the group consisting of physical properties, porosity, temper, precipitate growth, other properties as compared to the as-fabricated state; any combination thereof.

Figure 12:
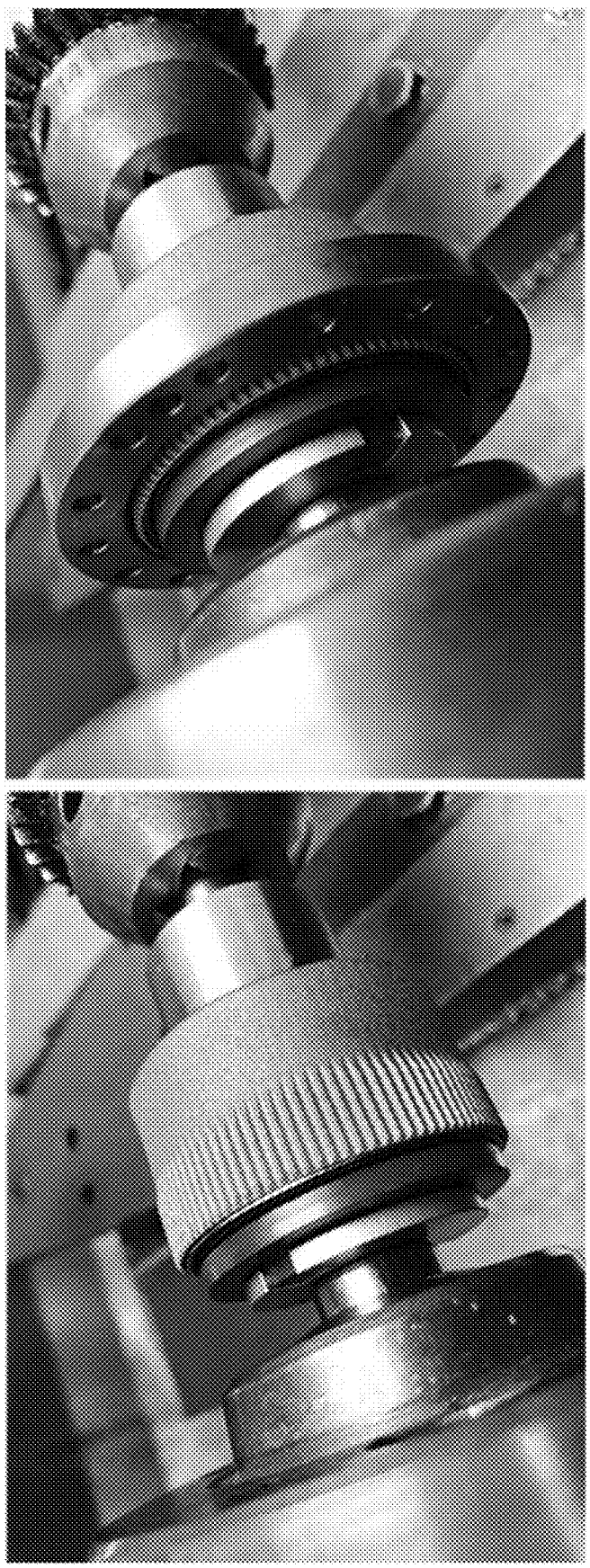
FIG. 12 shows an actual operation of an as-printed flexspline incorporated into a fully assembled standard strain wave gear in accordance with embodiments of the invention.

However, in some embodiments, the flexspline surfaces are left as-printed to save cost and the flexspline is used as is. In such embodiments, while the performance of the as-printed flexspline will be lower compared to a machined flexspline due to the rough surface finish, it can still be used directly out of the printer to significantly reduce cost of production. To this ends, FIG. 12 shows the operation of a flexspline that was 3D printed according to embodiments and assembled into a standard strain wave gear directly out of the printer with no machining. Although the printed flexspline had a very rough surface, it still proved to be functional in actual tests.

As new metal deposition technologies become available, the method of the application can be extended to other 3D printing methods. For example, when available, high resolution ink jet metal printing or liquid metal printing used with the method of the application will allow for fabrication of smooth precisely executed flexspline ready to be utilized directly after printing with no post processing. As another example, metal printers that combine both 3D printing with CNC machining in the same process have recently became available and, in many embodiments, can be used to manufacture and finish flexsplines according to the method of the application. Specifically, the flexspline may be oriented vertically (according to the method of the application) during the fabrication with such systems in order to take advantage of the CNC tool bit, which can only move up, down, or in a circle.

Exemplary Embodiments of Manufactured Flexsplines

Accordingly, in many embodiments, the method disclosed herein allows for facile, rapid, and inexpensive fabrication of strain wave gear flexsplines using metal additive manufacturing. Due to various functionality-specific constraints imposed on strain wave gears and specifically on flexspline components (e.g. must have high material tolerance and smooth surface finishes), and in view of limitations of metal printing capabilities, the method of the application is unexpected and nonobvious. Furthermore, in many embodiments, the method of the application allows for fabrication of flexsplines from previously inaccessible for this purpose alloys and material compositions. In addition, in some embodiments, the method of the application allows for material properties gradient or material composition gradient within a flexspline structure, which is not possible to achieve via heritage steel machining methods. In many embodiments, the method is used to efficiently fabricate functional flexsplines featuring: exquisitely thin walls, precisely net-shaped gear teeth, and enhanced mechanical properties, such as enhanced ductility. In addition, in many embodiments, the flexsplines fabricated according to the method of the application require little to none post-production machining or post-production finishing. Examples of flexsplines manufactured according to the methods disclosed herein are shown and compared to heritage flexsplines in FIGS. 13*a* to 13*d*

Figure 13A:
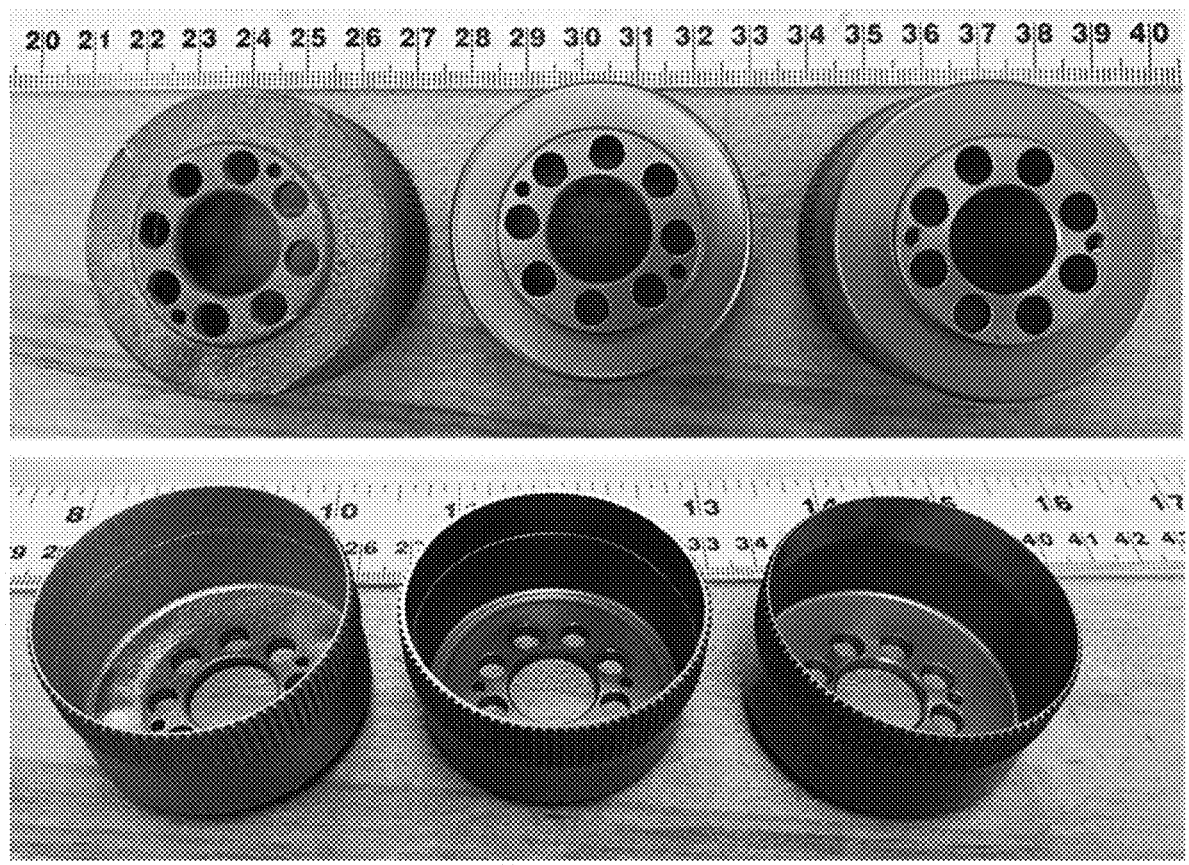
FIGS. 13a-13d compare examples of heritage flexsplines fabricated in accordance with prior art and examples of flexsplines fabricated in accordance with embodiments of the invention, where FIG. 13a compares the top and bottom views of printed (left), cast (center) and machined (right) flexsplines.
Figure 13B:
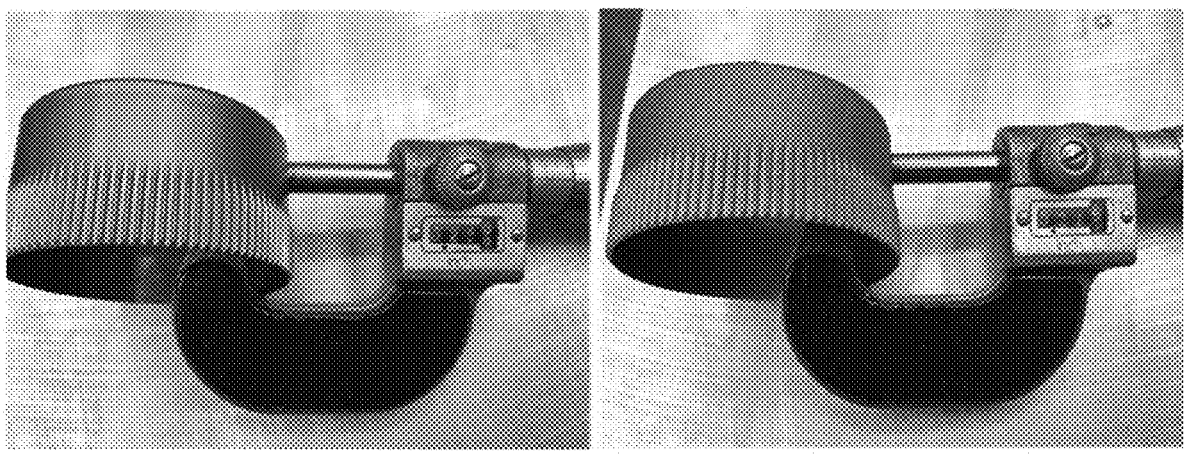
Figure 13C:
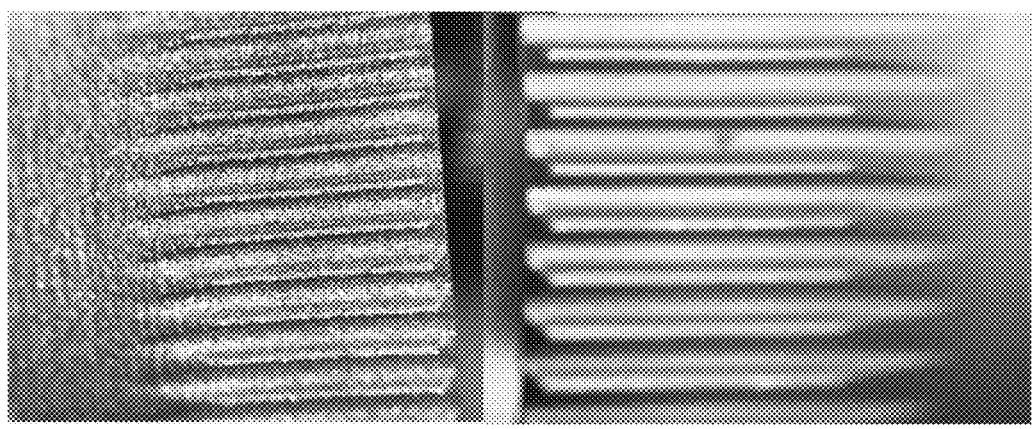

Specifically, FIG. 13*a* compares the top and bottom views of a printed (left), cast (center) and machined (right) flexsplines, wherein the flexspline printed according to embodiments has the roughest appearance, but may be made with metals that are difficult to machine or cast, and/or may have a gradient of properties in the bottom to the teeth direction. FIG. 13*b* compares micrometer readings (i.e. wall thickness) of a machined steel flexspline (0.02 inches, left) and a flexspline printed from steel according to embodiments (0.015 inches, right), and demonstrates that the method of the application can achieve a thickness that is the same or even thinner than machining methods. It should be noted that such low wall thickness can never be fully realized via casting methods. Finally, FIG. 13*c* shows the difference in roughness between the teeth on a printed flexspline (left) and a heritage machined flexspline (right). Although the finish of the printed flexspline is much rougher, it also clearly shows a "laminate" structure formed of the build layers, which is perpendicular to the direction of the expected normal failure mode, and therefore, implies a higher resistance to crack growth than a monolithic material. In addition, the method of the application allows to achieve complex curvatures in the teeth that are hard to achieve via machining and cannot be achieved through casting.

Figure 13D:
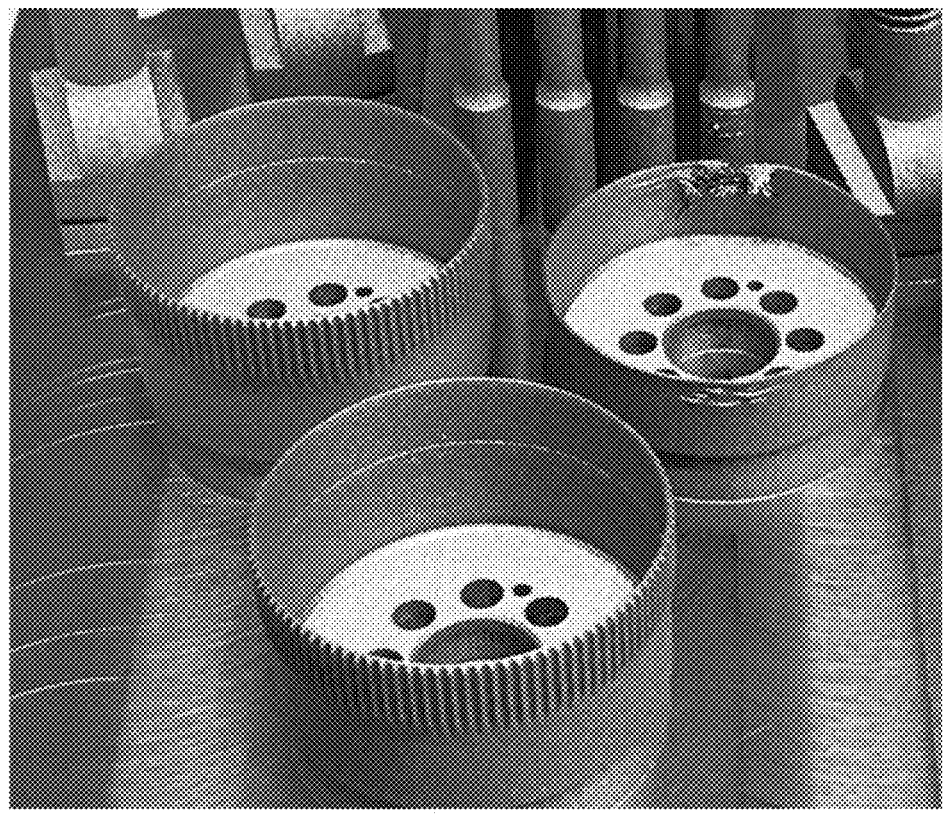

Finally, FIG. 13*d* shows two flexsplines (left and center) printed according to current embodiments, and one (right) printed where the laser properties have not been modified in such a way to assure that the entire flexspline wall is heated throughout during each building layer such that the wall of the flexspline is resistant to fracturing, and using a conventional hard steel recoater blade. As shown, this combination can result in the catastrophic failure of flexspline wall.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for fabricating a strain wave gear flexspline comprising:
   using an additive manufacturing process for manufacturing metal to form an entirety of the strain wave gear flexspline as a single piece, wherein the strain wave gear flexspline is a cylindrical shape comprising:
      depositing a bottom defining a circumference on a build platform,
      wherein the bottom of the cylindrical shape is a circle with a thickness of at least one build layer,
      further depositing a cylindrical wall disposed atop the bottom and defining a cylindrical volume, wherein the cylindrical wall is oriented perpendicularly to the build platform during fabrication, and
      forming gear teeth disposed along the wall's edge, wherein
         the cylindrical wall has a thickness of between 0.05 and 2 mm; and
         the strain wave gear flexspline is fabricated in a vertical orientation by depositing layer by layer in a continuous seamless circle;
   wherein the material physical properties of grain size, toughness, hardness, fracture toughness, fatigue limit, ductility, elastic modulus, and any combinations thereof of the strain wave gear flexspline within any single deposition layer are the same and are axially symmetric;
   wherein the material physical properties of grain size, toughness, hardness, fracture toughness, fatigue limit, ductility, elastic modulus, and any combinations thereof of the strain wave gear flexspline in at least two adjacent deposition layers are different such that the mechanical properties of the strain wave gear flexspline vary between the bottom and the gear teeth; and
   wherein the additive manufacturing process is powder bed fusion printing or direct energy deposition printing.

2. The method of claim 1, wherein the strain wave gear flexspline is attached to the building platform for support during fabrication only at the bottom during fabrication.

3. The method of claim 1, wherein the wall thickness of the strain wave gear flexspline is between 0.05 and 1 mm.

4. The method of claim 1, wherein the additive manufacturing process comprises a laser and the flexspline has a cup shape with a base and gear teeth on the cylindrical wall on one side of the cup, wherein the thickness of the cup wall is within 15% of the spot size of the laser.

5. The method of claim 1, wherein the additive manufacturing process comprises a laser and the cup wall is fabricated using a single width of the laser scanning or a single wire deposition extrusion process.

6. The method of claim 1, wherein at least one of the composition, or microstructure of the strain wave gear flexspline are uniform in the direction parallel to the building platform but vary in the direction perpendicular to the building platform.

7. The method of claim 1, wherein the strain wave gear flexspline is fabricated from a material with a fracture toughness between 30 and 150 MPa m$^{1/2}$.

8. The method of claim 1, wherein the material of the strain wave gear flexspline along the direction perpendicular to the building platform has a variable fracture toughness between 30 and 150 MPa m$^{1/2}$.

9. The method of claim 1, wherein the elastic limit of the strain wave gear flexspline ranges from 0.1-2%.

10. The method of claim 1, wherein the strain wave gear flexspline comprises at least two regions with the same chemical composition but distinct physical properties of grain size, toughness, hardness, fracture toughness, fatigue limit, ductility, elastic modulus, and any combinations thereof disposed along the direction perpendicular to the building platform.

11. The method of claim 1, wherein the strain wave gear flexspline comprises at least two regions of different chemical compositions disposed along the direction perpendicular to the building platform.

12. The method of claim 1, wherein a gear teeth region of the strain wave gear flexspline comprising the gear teeth comprises a material that is chemically, physically, or both, different from the rest of the strain wave gear flexspline, and wherein the gear teeth region is more resistant to wear than the rest of the strain wave gear flexspline.

13. The method of claim 1, wherein a gear teeth-less region of the strain wave gear flexspline that excludes gear teeth comprises a material that is chemically, physically, or both, different from the gear teeth region of the strain wave gear flexspline, and wherein the gear teeth-less region is more resistant to fracture than the rest of the strain wave gear flexspline.

14. The method of claim 1, wherein a material used in the fabrication of the strain wave flexspline is introduced from a building head during direct energy deposition printing.

15. The method of claim 1, wherein the additive manufacturing process utilizes a material in one of the forms chosen from the group consisting of:
   powder, wire, molten metal, liquid metal, metal in a binder, metal in dissolvable inks, metal bound in polymer, sheet metal, or any combination thereof.

16. The method of claim 1, wherein the gear teeth have a vertically oriented curvature.

17. The method of claim 1, further comprising a post-fabrication process selected from the group consisting of:
   chemical treatment to smooth the surface of the gear teeth and the inner surface of the cup wall;

mechanically grinding, sanding or polishing to reduce surface roughness;

coating with another metal;

heat treating to alter one or more material properties chosen from the group consisting of physical properties of grain size, toughness, hardness, fracture toughness, fatigue limit, ductility, elastic modulus, and any combinations thereof, porosity, temper, precipitate growth as compared to the as-fabricated state; and any combination thereof.

18. The method of claim 1, wherein the strain wave gear flexspline is fabricated from an alloy, a bulk metallic glass or metallic glass composite based on one or more elements chosen from the group consisting of: Fe, Ni, Zr, Ti, Cu, Al, Nb, Ta, W, Mo, V, Hf, Au, Pd, Pt, Ag, Zn, Ga, Mg, or any combination thereof.

19. The method of claim 1, wherein the strain wave gear flexspline is fabricated from a metal matrix composite, and wherein the porosity or the chemical composition of the metal matrix composite, or both, is uniform in the direction parallel to the building platform but variable in the directing perpendicular to the building platform.

20. The method of claim 1, wherein the strain wave gear flexspline is fabricated from both a crystalline metal alloy and a metallic glass alloy, and wherein the two materials are interchanged in the directing perpendicular to the building platform.

21. The method of claim 1, wherein the strain wave gear flexspline is fabricated from a high melting temperature alloy with a melting temperature greater than 1,500 Celsius.

22. The method of claim 21, wherein the high melting temperature alloy is Inconel or an alloy based on one of the elements chosen from the list: Nb, Ta, W, Mo, V, any combination thereof.

23. The method of claim 1, wherein the gear teeth have a curved shape.

24. The method of claim 1, wherein the flexspline has a cup shape with a base and gear teeth on the cylindrical wall on one side of the cup.

25. The method of claim 1, wherein the additive manufacturing process comprises an electron beam.

* * * * *